United States Patent
Uchiyama et al.

(10) Patent No.: US 10,545,435 B2
(45) Date of Patent: Jan. 28, 2020

(54) IMAGE HEATING APPARATUS THAT CONTROLS HEAT GENERATING QUANTITIES OF A PLURALITY OF HEAT GENERATING ELEMENTS BASED ON HEAT ACCUMULATION AMOUNTS, AND AN IMAGE FORMING APPARATUS HAVING THE IMAGE HEATING APPARATUS

(71) Applicant: CANON KABUSHIKI KAISHA, Tokyo (JP)

(72) Inventors: Takahiro Uchiyama, Mishima (JP); Atsushi Iwasaki, Susono (JP)

(73) Assignee: Canon Kabushiki Kaisha, Tokyo (JP)

(*) Notice: Subject to any disclaimer, the term of this patent is extended or adjusted under 35 U.S.C. 154(b) by 10 days.

(21) Appl. No.: 15/876,455

(22) Filed: Jan. 22, 2018

(65) Prior Publication Data

US 2018/0210380 A1 Jul. 26, 2018

(30) Foreign Application Priority Data

Jan. 26, 2017 (JP) ................................. 2017-012046

(51) Int. Cl.
*G03G 15/20* (2006.01)
*H04N 1/00* (2006.01)

(52) U.S. Cl.
CPC ..... *G03G 15/2039* (2013.01); *H04N 1/00891* (2013.01); *H04N 2201/0082* (2013.01)

(58) Field of Classification Search
CPC ........... G03G 15/2039; G03G 15/2042; G03G 15/2053; G03G 2215/2053; H04N 1/00891; H04N 2201/0082
(Continued)

(56) References Cited

U.S. PATENT DOCUMENTS 7,193,181 B2  3/2007  Makihira et al.
7,283,145 B2  10/2007  Kato et al.
(Continued)

FOREIGN PATENT DOCUMENTS

JP  06-95540 A  4/1994
JP  2014-035373 A  2/2014
(Continued)

*Primary Examiner* — Walter L Lindsay, Jr.
*Assistant Examiner* — Jessica L Eley
(74) *Attorney, Agent, or Firm* — Venable LLP

(57) ABSTRACT

An image heating apparatus includes a heater having a plurality of heat generating elements, a roller for forming a nip portion with the heater, an acquisition portion that acquires a plurality of count values indicating heat accumulation amounts of a plurality of heating regions heated by the plurality of heat generating elements, respectively, and a control portion that controls electrical power to be supplied to the plurality of heat generating elements to control individual heat generating quantities of the plurality of heat generating elements. The control portion controls the heat generating quantities so that a difference between a first count value indicating a heat accumulation amount of a first heating region heated by a first heat generating element and a second count value indicating a heat accumulation amount of a second heating region heated by a second heat generating element is maintained within a predetermined range.

28 Claims, 22 Drawing Sheets

(58) Field of Classification Search
USPC .......................................................... 399/69
See application file for complete search history.

(56) References Cited

U.S. PATENT DOCUMENTS

| | | | |
|---|---|---|---|
| 7,366,455 B2 | 4/2008 | Iwasaki et al. | |
| 7,469,120 B2 | 12/2008 | Iwasaki et al. | |
| 9,335,709 B2 | 5/2016 | Iwasaki et al. | |
| 9,665,048 B2 | 5/2017 | Iwasaki et al. | |
| 2012/0308253 A1* | 12/2012 | Kurata | G03G 15/2042 399/69 |
| 2013/0195494 A1* | 8/2013 | Asami | G03G 15/2042 399/70 |
| 2015/0185671 A1* | 7/2015 | Ikebuchi | G03G 15/2042 399/69 |
| 2015/0286174 A1* | 10/2015 | Yamamoto | G03G 15/2039 399/69 |
| 2018/0004134 A1 | 1/2018 | Nomura et al. | |
| 2018/0004135 A1 | 1/2018 | Sako et al. | |
| 2018/0004136 A1 | 1/2018 | Iwasaki | |
| 2018/0032008 A1 | 2/2018 | Sako et al. | |

FOREIGN PATENT DOCUMENTS

| | | |
|---|---|---|
| JP | 2014-153506 A | 8/2014 |
| JP | 2015-036744 A | 2/2015 |

* cited by examiner

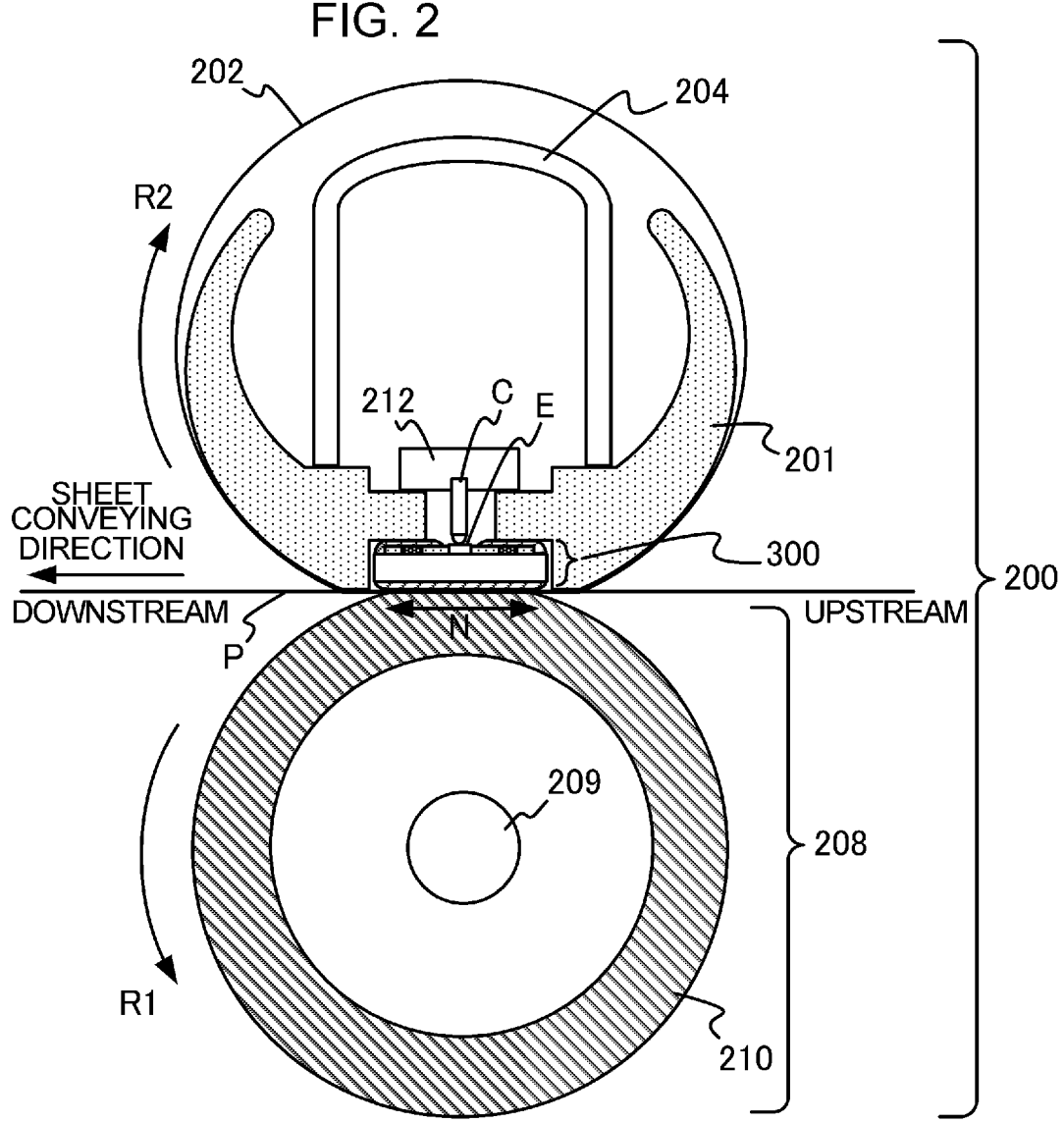

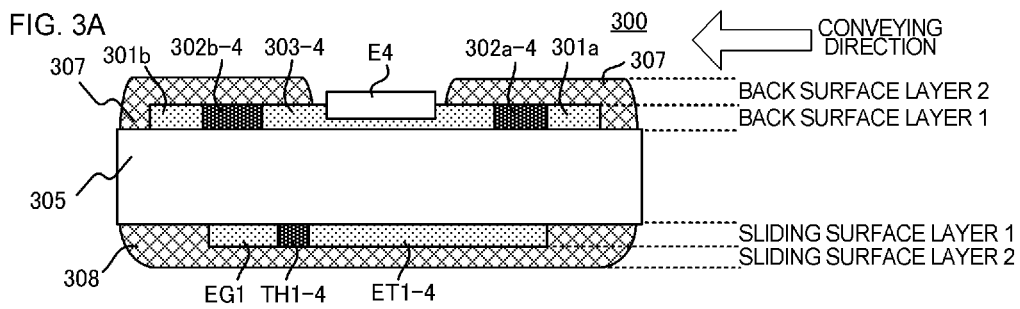
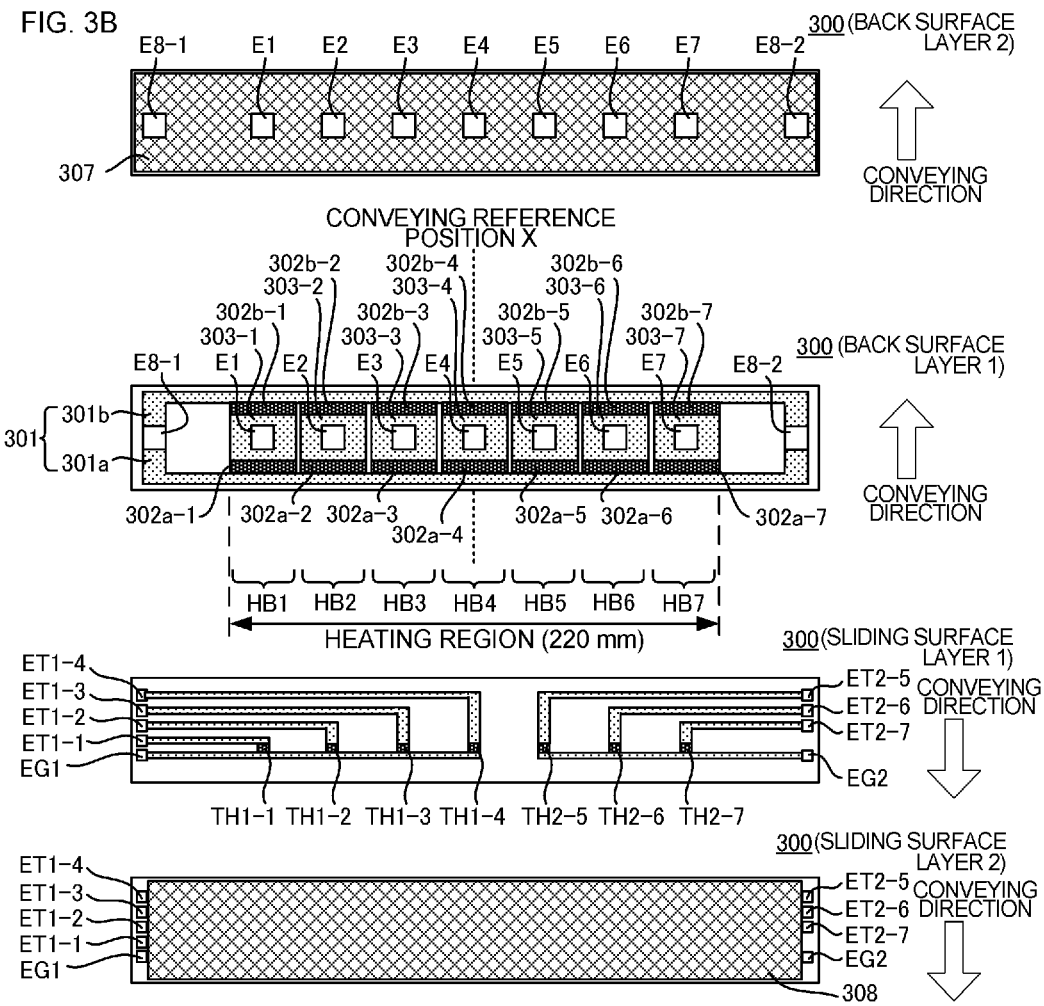
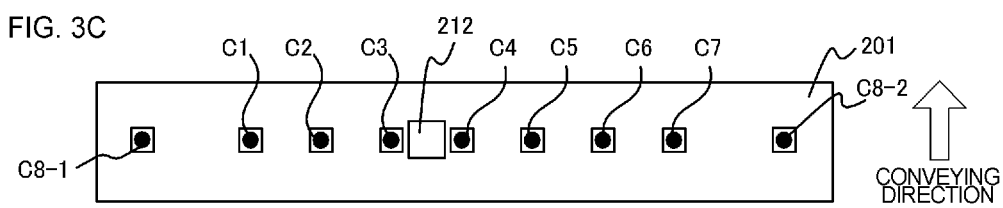

< CLASSIFICATION BASED ON SHEET SIZE INFORMATION >

| A1 | A2 | A3 | A4 | A5 | A6 | A7 |
|----|----|----|----|----|----|----|
| AE | AM | AM | AM | AM | AM | AE |

< CLASSIFICATION BASED ON IMAGE INFORMATION >

|    | A1 | A2 | A3 | A4 | A5 | A6 | A7 |
|----|----|----|----|----|----|----|----|
| T1 | AI | AI | AI | AI | AP | AP | AP |
| T2 | AP | AI | AI | AI | AI | AI | AP |
| T3 | AP | AI | AI | AI | AI | AI | AP |
| T4 | AP | AI | AI | AI | AI | AI | AP |
| T5 | AP | AI | AI | AI | AI | AI | AP |

FIG. 8A
SETTING VALUE OF TEMPERATURE CORRECTION TERM $K_{AI}$ OF IMAGE HEATING REGION

| HEAT ACCUMULATION COUNT VALUE $CT_i$ | $K_{AI}$ (°C) |
|---|---|
| $CT_i \leq 100$ | 0 |
| $100 < CT_i \leq 200$ | 2 |
| $200 < CT_i \leq 300$ | 4 |
| $300 < CT_i \leq 400$ | 6 |
| $400 < CT_i \leq 500$ | 9 |
| $500 < CT_i \leq 600$ | 11 |
| $600 < CT_i$ | 13 |

FIG. 8B
SETTING VALUE OF TEMPERATURE CORRECTION TERM $K_{AP}$ OF NON-IMAGE HEATING REGION

| HEAT ACCUMULATION COUNT VALUE $CT_i$ | $K_{AP}$ (°C) |
|---|---|
| $CT_i \leq 100$ | 0 |
| $100 < CT_i \leq 200$ | 4 |
| $200 < CT_i \leq 300$ | 8 |
| $300 < CT_i \leq 400$ | 12 |
| $400 < CT_i \leq 500$ | 16 |
| $500 < CT_i$ | 20 |

FIG. 8C
SETTING VALUE OF TEMPERATURE CORRECTION TERM $K_{AN}$ OF NON-SHEET-PASSING HEATING REGION

| NON-SHEET-PASSING HEATING REGION TEMPERATURE CORRECTION TERM | $K_{AN}=0$ |
|---|---|

FIG. 9A
SETTING VALUE OF HEATING COUNT TC

| CONTROL TEMPERATURE $TGT_i$ (°C) | TC |
|---|---|
| $TGTi \leq 125$ | 0.7 |
| $125 < TGTi \leq 135$ | 0.8 |
| $135 < TGTi \leq 145$ | 0.9 |
| $145 < TGTi \leq 155$ | 1.0 |
| $155 < TGTi \leq 165$ | 1.1 |
| $165 < TGTi \leq 170$ | 1.2 |
| $170 < TGTi \leq 175$ | 1.3 |
| $175 < TGTi \leq 180$ | 1.4 |
| $180 < TGTi \leq 185$ | 1.5 |
| $185 < TGTi \leq 188$ | 1.6 |
| $188 < TGTi \leq 191$ | 1.7 |
| $191 < TGTi \leq 194$ | 1.8 |
| $194 < TGTi \leq 197$ | 1.9 |
| $197 < TGTi \leq 200$ | 2.0 |
| $200 < TGTi$ | 2.1 |

FIG. 9B
SETTING VALUE OF PASSING-RECORDING-SHEET COUNT RMC

| CLASSIFICATION OF HEATING REGION $A_i$ | RMC |
|---|---|
| NON-SHEET-PASSING HEATING REGION | 0.0 |
| IMAGE HEATING REGION AI | 1.1 |
| NON-IMAGE HEATING REGION AP | 1.1 |

FIG. 9C
SETTING VALUE OF HEAT RADIATION COUNT DC

| HEAT ACCUMULATION COUNT VALUE $CT_i$ | DC |
|---|---|
| $CTi \leq 100$ | 0.01 |
| $100 < CTi \leq 250$ | 0.11 |
| $250 < CTi \leq 400$ | 0.30 |
| $400 < CTi \leq 550$ | 0.50 |
| $550 < CTi \leq 700$ | 0.80 |
| $700 < CTi$ | 1.20 |

FIG. 9D
SETTING VALUE OF STARTUP COUNT WUC

| HEAT ACCUMULATION COUNT VALUE $CT_i$ | WUC |
|---|---|
| $CTi \leq 100$ | 14.0 |
| $100 < CTi \leq 200$ | 11.0 |
| $200 < CTi \leq 300$ | 8.0 |
| $300 < CTi \leq 450$ | 5.0 |
| $450 < CTi \leq 650$ | 2.0 |
| $650 < CTi$ | 0.4 |

< CLASSIFICATION BASED ON SHEET SIZE INFORMATION >

| | A1 | A2 | A3 | A4 | A5 | A6 | A7 |
|---|---|---|---|---|---|---|---|
| | AE | AM | AM | AM | AM | AM | AE |

< CLASSIFICATION BASED ON IMAGE INFORMATION >

| | A1 | A2 | A3 | A4 | A5 | A6 | A7 |
|---|---|---|---|---|---|---|---|
| T1~T5 | AP | AI | AI | AI | AI | AI | AP |

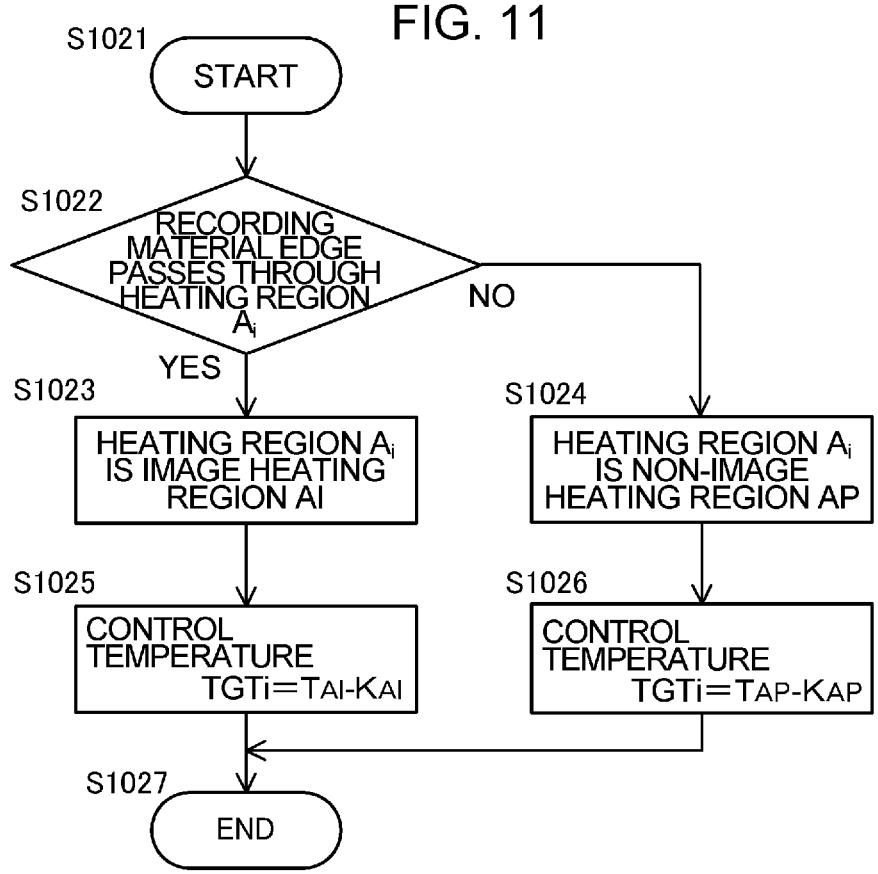

FIG. 12A

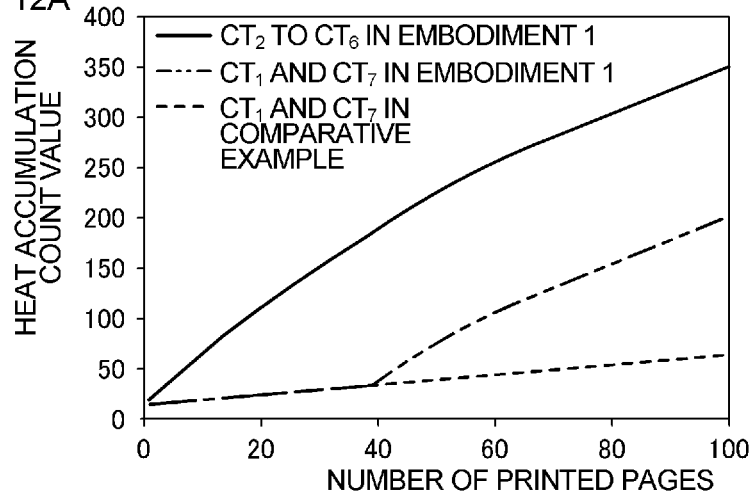

FIG. 12B  EMBODIMENT 1

| NUMBER OF PASSING SHEETS | CONTROL TEMPERATURE | | HEAT ACCUMULATION COUNT VALUE | | DETERMINATION IN S1010 | OCCURRENCE OF PAPER WRINKLE |
|---|---|---|---|---|---|---|
| | $A_1, A_7$ | $A_2 \sim A_6$ | $CT_1, CT_7$ | $CT_2 \sim CT_6$ | $CT_2-CT_1$ | |
| 10 PAGES | 158 | 198 | 19.0 | 64.0 | 45.0 | YES | NO |
| 20 PAGES | 158 | 196 | 23.9 | 111.7 | 87.8 | YES | NO |
| 30 PAGES | 158 | 196 | 28.9 | 150.7 | 121.8 | YES | NO |
| 40 PAGES | 198 | 196 | 38.3 | 189.6 | 151.3 | NO | NO |
| 50 PAGES | 198 | 194 | 74.8 | 225.1 | 150.3 | NO | NO |
| 70 PAGES | 196 | 194 | 130.0 | 280.4 | 150.4 | NO | NO |

FIG. 12C  COMPARATIVE EXAMPLE

| NUMBER OF PASSING SHEETS | CONTROL TEMPERATURE | | HEAT ACCUMULATION COUNT VALUE | | HEAT ACCUMULATION COUNT VALUE DIFFERENCE | OCCURRENCE OF PAPER WRINKLE |
|---|---|---|---|---|---|---|
| | $A_1, A_7$ | $A_2 \sim A_6$ | $CT_1, CT_7$ | $CT_2 \sim CT_6$ | $CT_2-CT_1$ | |
| 10 PAGES | 158 | 198 | 19.0 | 64.0 | 45.0 | NO |
| 20 PAGES | 158 | 196 | 23.9 | 111.7 | 87.8 | NO |
| 30 PAGES | 158 | 196 | 28.9 | 150.7 | 121.8 | NO |
| 50 PAGES | 158 | 194 | 38.8 | 225.1 | 186.3 | YES |
| 70 PAGES | 158 | 194 | 48.7 | 280.4 | 231.7 | YES |

FIG. 13B
SETTING VALUE OF PAPER
WRINKLE CORRECTION TERM $W_{AI}$
OF IMAGE HEATING REGION

| HEAT ACCUMULATION COUNT VALUE $CT_i$ | $W_{AI}$ |
|---|---|
| $CT_i \leq 100$ | 2.0 |
| $100 < CT_i \leq 200$ | 1.0 |
| $200 < CT_i \leq 300$ | 1.0 |
| $300 < CT_i \leq 400$ | 1.0 |
| $400 < CT_i \leq 500$ | 1.0 |
| $500 < CT_i$ | 1.0 |

FIG. 13C
SETTING VALUE OF PAPER
WRINKLE CORRECTION TERM $W_{AP}$
OF NON-IMAGE HEATING REGION

| HEAT ACCUMULATION COUNT VALUE $CT_i$ | $W_{AP}$ |
|---|---|
| $CT_i \leq 100$ | 35.0 |
| $100 < CT_i \leq 200$ | 35.0 |
| $200 < CT_i \leq 300$ | 35.0 |
| $300 < CT_i \leq 400$ | 35.0 |
| $400 < CT_i \leq 500$ | 35.0 |
| $500 < CT_i$ | 35.0 |

FIG. 14A

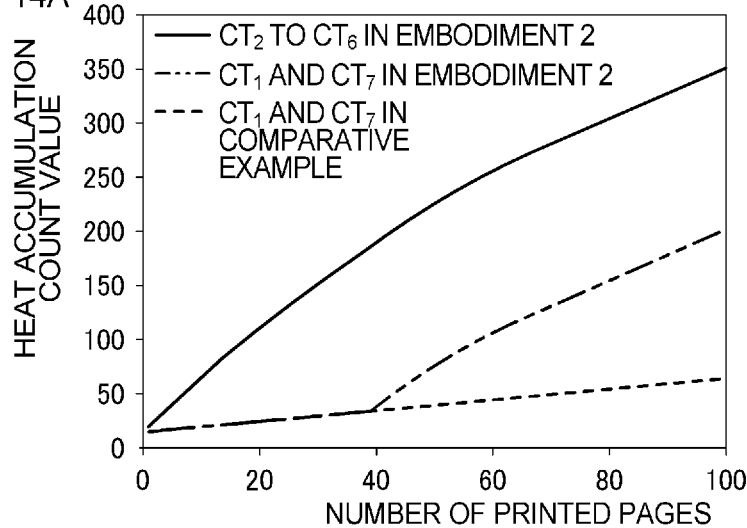

FIG. 14B  EMBODIMENT 2

| NUMBER OF PASSING SHEETS | CONTROL TEMPERATURE | | HEAT ACCUMULATION COUNT VALUE | | DETERMINATION IN S1040 | OCCURRENCE OF PAPER WRINKLE |
|---|---|---|---|---|---|---|
| | $A_1, A_7$ | $A_2 \sim A_6$ | $CT_1, CT_7$ | $CT_2 \sim CT_6$ | $CT_2 - CT_1$ | |
| 10 PAGES | 158 | 198 | 19.0 | 64.0 | 45.0 | YES | NO |
| 20 PAGES | 158 | 196 | 23.9 | 111.7 | 87.8 | YES | NO |
| 30 PAGES | 158 | 196 | 28.9 | 150.7 | 121.8 | YES | NO |
| 40 PAGES | 193 | 196 | 37.3 | 189.6 | 152.3 | NO | NO |
| 50 PAGES | 193 | 194 | 73.8 | 228.5 | 154.7 | NO | NO |
| 70 PAGES | 189 | 194 | 130.0 | 280.4 | 150.4 | NO | NO |

FIG. 14C  COMPARATIVE EXAMPLE

| NUMBER OF PASSING SHEETS | CONTROL TEMPERATURE | | HEAT ACCUMULATION COUNT VALUE | | HEAT ACCUMULATION COUNT VALUE DIFFERENCE | OCCURRENCE OF PAPER WRINKLE |
|---|---|---|---|---|---|---|
| | $A_1, A_7$ | $A_2 \sim A_6$ | $CT_1, CT_7$ | $CT_2 \sim CT_6$ | $CT_2 - CT_1$ | |
| 10 PAGES | 158 | 198 | 19.0 | 64.0 | 45.0 | NO |
| 20 PAGES | 158 | 196 | 23.9 | 111.7 | 87.8 | NO |
| 30 PAGES | 158 | 196 | 28.9 | 150.7 | 121.8 | NO |
| 50 PAGES | 158 | 194 | 38.8 | 225.1 | 186.3 | YES |
| 70 PAGES | 158 | 194 | 48.7 | 280.4 | 231.7 | YES |

FIG. 15B
SETTING VALUE OF PAPER CONVEYING DEFECT CORRECTION TERM $X_{AI}$ OF IMAGE HEATING REGION

| HEAT ACCUMULATION COUNT VALUE $CT_i$ | $X_{AI}$ |
|---|---|
| $CT_i \leq 100$ | 2.0 |
| $100 < CT_i \leq 200$ | 1.0 |
| $200 < CT_i \leq 300$ | 1.0 |
| $300 < CT_i \leq 400$ | 1.0 |
| $400 < CT_i \leq 500$ | 1.0 |
| $500 < CT_i$ | 1.0 |

FIG. 15C
SETTING VALUE OF PAPER CONVEYING DEFECT CORRECTION TERM $X_{AP}$ OF NON-IMAGE HEATING REGION

| HEAT ACCUMULATION COUNT VALUE $CT_i$ | $X_{AP}$ |
|---|---|
| $CT_i \leq 100$ | 35.0 |
| $100 < CT_i \leq 200$ | 35.0 |
| $200 < CT_i \leq 300$ | 35.0 |
| $300 < CT_i \leq 400$ | 35.0 |
| $400 < CT_i \leq 500$ | 35.0 |
| $500 < CT_i$ | 35.0 |

< CLASSIFICATION BASED ON IMAGE INFORMATION >

|  | A1 | A2 | A3 | A4 | A5 | A6 | A7 |
|---|---|---|---|---|---|---|---|
| T1~T5 | AI | AP | AP | AP | AP | AP | AI |

FIG. 17A

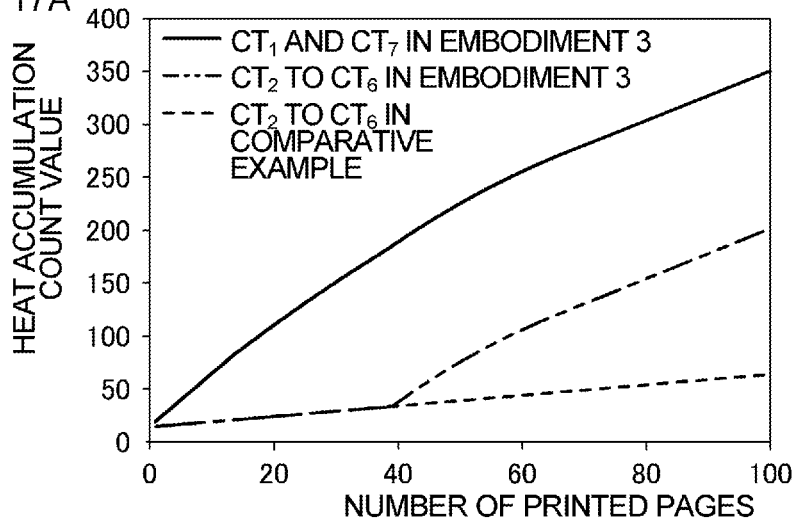

FIG. 17B EMBODIMENT 3

| NUMBER OF PASSING SHEETS | CONTROL TEMPERATURE | | HEAT ACCUMULATION COUNT VALUE | | | DETERMINATION IN S1060 | OCCURRENCE OF TRAILING EDGE POP-UP |
|---|---|---|---|---|---|---|---|
| | $A_1, A_7$ | $A_2 \sim A_6$ | $CT_1, CT_7$ | $CT_2 \sim CT_6$ | $CT_1-CT_2$ | | |
| 10 PAGES | 198 | 158 | 64.0 | 19.0 | 45.0 | YES | NO |
| 20 PAGES | 196 | 158 | 111.7 | 23.9 | 87.8 | YES | NO |
| 30 PAGES | 196 | 158 | 150.7 | 28.9 | 121.8 | YES | NO |
| 40 PAGES | 196 | 193 | 189.6 | 37.3 | 152.3 | NO | NO |
| 50 PAGES | 194 | 193 | 228.5 | 73.8 | 154.7 | NO | NO |
| 70 PAGES | 194 | 189 | 280.4 | 130.0 | 150.4 | NO | NO |

FIG. 17C COMPARATIVE EXAMPLE

| NUMBER OF PASSING SHEETS | CONTROL TEMPERATURE | | HEAT ACCUMULATION COUNT VALUE | | HEAT ACCUMULATION COUNT VALUE DIFFERENCE | OCCURRENCE OF TRAILING EDGE POP-UP |
|---|---|---|---|---|---|---|
| | $A_1, A_7$ | $A_2 \sim A_6$ | $CT_1, CT_7$ | $CT_2 \sim CT_6$ | $CT_2-CT_1$ | |
| 10 PAGES | 198 | 158 | 64.0 | 19.0 | 45.0 | NO |
| 20 PAGES | 196 | 158 | 111.7 | 23.9 | 87.8 | NO |
| 30 PAGES | 196 | 158 | 150.7 | 28.9 | 121.8 | NO |
| 50 PAGES | 194 | 158 | 225.1 | 38.8 | 186.3 | YES |
| 70 PAGES | 194 | 158 | 280.4 | 48.7 | 231.7 | YES |

< CLASSIFICATION BASED ON IMAGE INFORMATION >

|  | A1 | A2 | A3 | A4 | A5 | A6 | A7 |
|---|---|---|---|---|---|---|---|
| T1~T5 | AP | AP | AP | AP | AI | AI | AI |

FIG. 20A

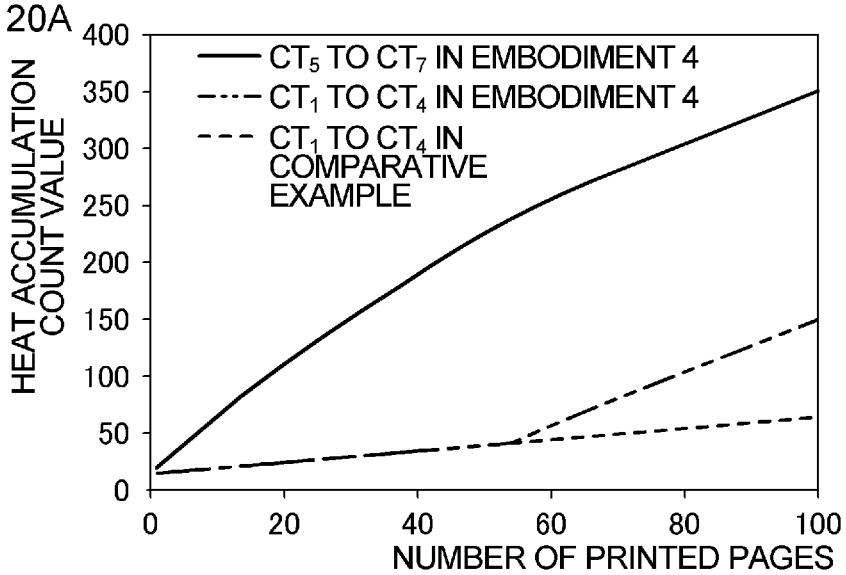

- CT$_5$ TO CT$_7$ IN EMBODIMENT 4
- CT$_1$ TO CT$_4$ IN EMBODIMENT 4
- CT$_1$ TO CT$_4$ IN COMPARATIVE EXAMPLE

FIG. 20B  EMBODIMENT 4

| NUMBER OF PASSING SHEETS | CONTROL TEMPERATURE | | HEAT ACCUMULATION COUNT VALUE | | | DETERMINATION IN S1067 |
|---|---|---|---|---|---|---|
| | $A_1 \sim A_4$ | $A_5 \sim A_7$ | $CT_1 \sim CT_4$ | $CT_5 \sim CT_7$ | $CT_7-CT_1$ | |
| 20 PAGES | 158 | 196 | 23.9 | 111.7 | 87.8 | YES |
| 40 PAGES | 158 | 196 | 33.8 | 189.6 | 155.8 | YES |
| 55 PAGES | 193 | 194 | 41.2 | 242.0 | 200.8 | NO |
| 80 PAGES | 189 | 192 | 101.5 | 303.9 | 202.4 | NO |
| 100 PAGES | 189 | 192 | 148.9 | 350.9 | 202.0 | NO |

FIG. 20C  COMPARATIVE EXAMPLE

| NUMBER OF PASSING SHEETS | CONTROL TEMPERATURE | | HEAT ACCUMULATION COUNT VALUE | | HEAT ACCUMULATION COUNT VALUE DIFFERENCE |
|---|---|---|---|---|---|
| | $A_1 \sim A_4$ | $A_5 \sim A_7$ | $CT_1 \sim CT_4$ | $CT_5 \sim CT_7$ | $CT_7-CT_1$ |
| 20 PAGES | 158 | 196 | 23.9 | 111.7 | 87.8 |
| 40 PAGES | 158 | 196 | 33.8 | 189.6 | 155.8 |
| 60 PAGES | 158 | 194 | 43.7 | 256.9 | 213.2 |
| 80 PAGES | 158 | 192 | 53.6 | 303.9 | 250.3 |
| 100 PAGES | 158 | 192 | 63.5 | 350.9 | 287.4 |

IMAGE HEATING APPARATUS THAT CONTROLS HEAT GENERATING QUANTITIES OF A PLURALITY OF HEAT GENERATING ELEMENTS BASED ON HEAT ACCUMULATION AMOUNTS, AND AN IMAGE FORMING APPARATUS HAVING THE IMAGE HEATING APPARATUS

This application claims the benefit of Japanese Patent Application No. 2017-12046, filed on Jan. 26, 2017, which is hereby incorporated by reference herein in its entirety.

BACKGROUND OF THE INVENTION

Field of the Invention

The present invention relates to an image forming apparatus, such as a copying machine or a printer, which uses an electrophotographic system or an electrostatic recording system. Moreover, the present invention relates to an image heating apparatus, such as a fixing unit mounted in an image forming apparatus, or a gloss applying apparatus that improves a gloss level of a toner image by re-heating the toner image fixed to a recording material.

Description of the Related Art

In an image heating apparatus, such as a fixing unit or a gloss applying apparatus, used in an electrophotographic image forming apparatus (hereafter an image forming apparatus), such as a copying machine or a printer, a method of selectively heating image portions formed on a recording material has been proposed in order to save power (see Japanese Patent Application Publication No. H06-95540). In this method, a heat generation range of a heater is divided into a plurality of heat generating blocks in a longitudinal direction (a direction orthogonal to a conveying direction of the recording material), and heat generation of respective heat generating blocks is selectively controlled depending on the presence of an image on the recording material. That is, energization of a heat generating block in a portion in which an image is not formed (a non-image portion) on the recording material is stopped to save power.

On the other hand, there is a demand to increase a recording material processing speed per unit time of the image heating apparatus to enhance image productivity. Therefore, it is requested to increase a recording material conveying speed. When a recording material conveying speed in such an image heating apparatus of Embodiment 11, as disclosed in Japanese Patent Application Publication No. H06-95540, increases, when energization control is switched from a non-image portion (an energization stop state) to an image portion, since a heating time is short, there may be a case in which the image portion cannot be sufficiently heated to a control temperature. In order to prevent this problem, a method of performing energization control so that the temperature reaches a predetermined control temperature at the time of switching to energization of a heat generating block of the non-image portion to thereby allow the temperature to quickly reach the control temperature of the image portion has been considered. In this case, the control temperature of the image portion is set to be less than the control temperature of the non-image portion so that both a power saving effect and image productivity can be achieved.

In an image heating apparatus that performs heat generation control using different control temperatures for respective heat generating blocks, however, a variation may occur in a heat accumulation state of respective heat generating blocks. As a result, this variation may cause a recording material conveying defect, such as a paper wrinkle or a trailing edge pop-up, thereby increasing a load applied to a fixing member, and decreasing a durability of constituent members. That is, in an image heating apparatus having heat generating blocks divided in the longitudinal direction, since the heat generating quantities of respective heat generating blocks differ depending on an image pattern on a recording material that passes through the heat generating block, a heat accumulation state of the fixing member is different in respective heat generating blocks. Since a roller, or the like, used in the fixing member is thermally expanded according to the heat accumulation amount, a recording material conveying performance or a rotational driving force of the fixing member is different in respective heat generating blocks. Therefore, due to a difference in conveying performance or rotational driving force of heat generating blocks in the image heating apparatus, there is a possibility that a conveying defect, such as a paper wrinkle or a trailing edge pop-up, may occur in a recording material. Moreover, since the rotational driving force of the fixing member is different in the longitudinal direction of the image heating apparatus, there is a possibility that the force of pulling a fixing film in one direction increases and the durability of the fixing film or a pressure roller decreases.

SUMMARY OF THE INVENTION

An object of the present invention is to provide a technology capable of enhancing a power saving function while suppressing the occurrence of a recording material conveying defect and a decrease in durability of a fixing member.

In order to achieve the object described above, one aspect of the invention provides an image heating apparatus including a heater having a plurality of heat generating elements arranged in a longitudinal direction orthogonal to a conveying direction of a recording material, and a control portion capable of controlling electrical power to be supplied to the plurality of heat generating elements to control individual heat generating quantities of the plurality of heat generating elements, wherein an image formed on the recording material is heated by the heat generated by the heater, wherein the image heating apparatus comprises an acquisition portion that acquires a plurality of count values indicating heat accumulation amounts of a plurality of heating regions heated by the plurality of heat generating elements, and wherein the control portion controls the heat generating quantities of the plurality of heat generating elements so that a difference between a first count value indicating a heat accumulation amount of a heating region heated by a first heat generating element among the plurality of heat generating elements and a second count value indicating a heat accumulation amount of a heating region heated by a second heat generating element among the plurality of heat generating elements is maintained within a predetermined range.

In order to achieve the object described above, another aspect of the invention provides an image forming apparatus including an image forming portion that forms an image on a recording material, and a fixing portion that fixes the image formed on the recording material, to the recording material, wherein the fixing portion is the image heating apparatus.

Further features of the present invention will become apparent from the following description of exemplary embodiments, with reference to the attached drawings.

BRIEF DESCRIPTION OF THE DRAWINGS

FIG. 2 is a cross-sectional view of an image heating apparatus according to Embodiment 1.

FIGS. 3A to 3C are diagrams illustrating a configuration of a heater according to Embodiment 1.

FIGS. 8A to 8C illustrate setting values of parameters associated with the control temperature according to Embodiment 1.

FIGS. 9A to 9D illustrate setting values of parameters associated with a heat accumulation count value according to Embodiment 1.

FIG. 11 is a flowchart for determining a classification and a control temperature of a heating region according to a comparative example.

FIGS. 12A to 12C are diagrams for describing an advantage of Embodiment 1.

FIGS. 13B and 13C illustrate setting values of parameters associated with the control temperature according to Embodiment 2.

FIGS. 14A to 14C are diagrams for describing an advantage of Embodiment 2.

FIGS. 15B and 15C illustrate setting values of parameters associated with the control temperature according to Embodiment 3.

FIGS. 17A to 17C are diagrams for describing an advantage of Embodiment 3.

FIGS. 20A to 20C are diagrams for describing an advantage of Embodiment 4.

DESCRIPTION OF THE EMBODIMENTS

Hereafter, a description will be given, with reference to the drawings, of embodiments (examples) of the present invention. The sizes, materials, shapes, their relative arrangements, or the like, of constituents described in the embodiments may, however, be appropriately changed according to the configurations, various conditions, or the like, of apparatuses to which the invention is applied. Therefore, the sizes, the materials, the shapes, their relative arrangements, or the like, of the constituents described in the embodiments do not limit the scope of the invention to the following embodiments.

Embodiment 1

1. Configuration of Image Forming Apparatus

Figure 1:
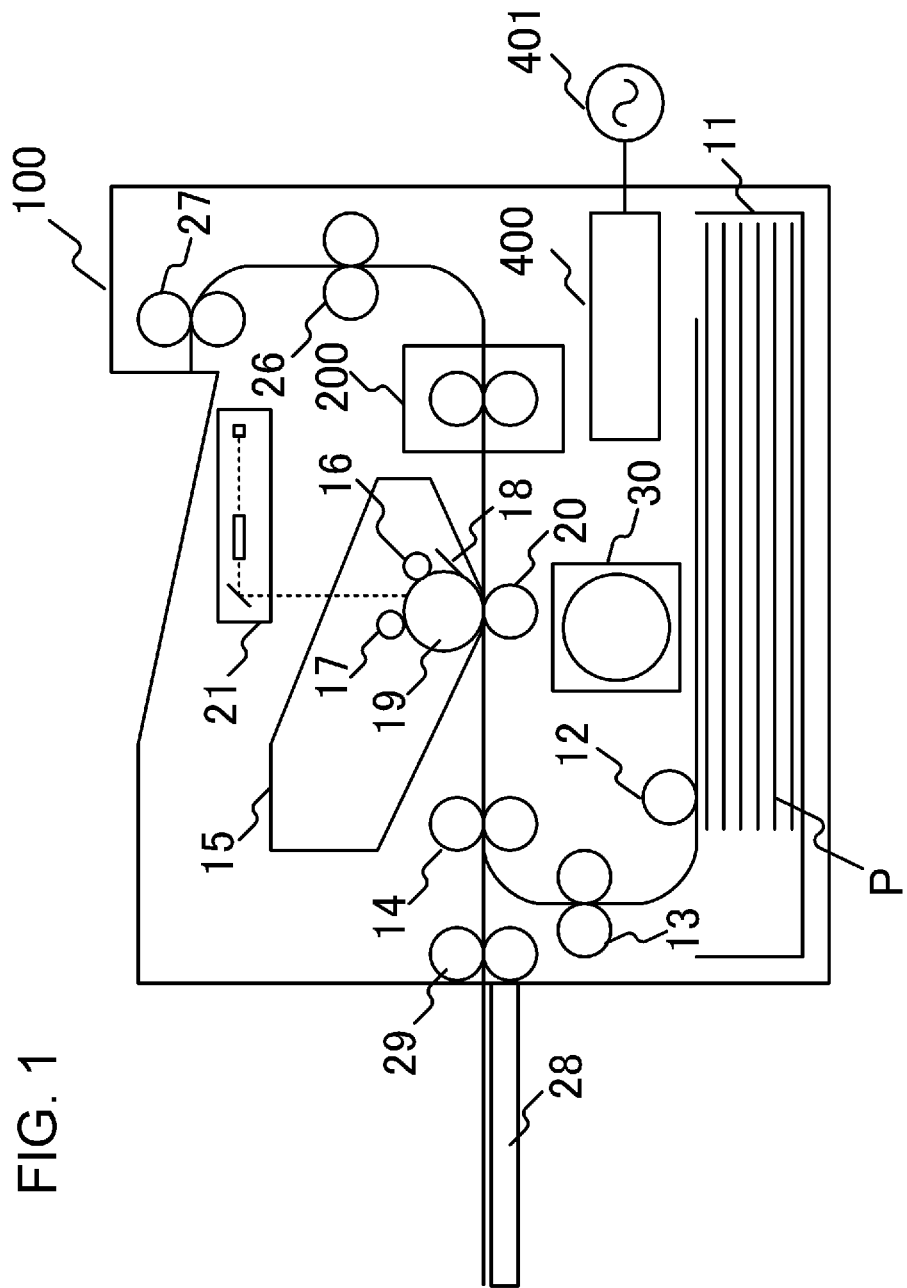
FIG. 1 is a cross-sectional view of an image forming apparatus according to an embodiment of the present invention.

FIG. 1 is a schematic cross-sectional view of an image forming apparatus according to an embodiment of the present invention. Examples of an image forming apparatus to which the present invention can be applied include a copying machine, a printer, and the like, that use an electrophotographic scheme or an electrostatic recording scheme. In this embodiment, a case in which the present invention is applied to a laser printer will be discussed.

When a print signal is generated, a scanner unit 21 emits a laser beam modulated according to image information to scan a photosensitive drum 19 that is charged to a predetermined polarity by a charging roller 16. In this way, an electrostatic latent image is formed on the photosensitive drum 19. When toner is supplied from a developing roller 17 to the electrostatic latent image, the electrostatic latent image on the photosensitive drum 19 is developed as a toner image. Meanwhile, a recording material (a recording sheet) P stacked on a sheet feed cassette 11 is fed by a pickup roller 12 one by one, and is conveyed toward a registration roller pair 14 by a conveying roller pair 13. Furthermore, the recording material P is conveyed from the registration roller pair 14 to a transfer position in synchronization with a timing at which the toner image on the photosensitive drum 19 reaches a transfer position formed by the photosensitive drum 19 and a transfer roller 20. The toner image on the photosensitive drum 19 is transferred to the recording material P in the course in which the recording material P passes through the transfer position. After that, the recording material P is heated by a fixing apparatus 200 as a fixing portion of an image heating apparatus, and the toner image is heated and fixed to the recording material P. The recording material P that bears the toner image fixed thereto is discharged to a tray in an upper part of the image forming apparatus 100 by conveying roller pairs 26 and 27.

Reference numeral 18 is a drum cleaner that cleans the photosensitive drum 19, and reference numeral 28 is a sheet feed tray (a manual tray) having a pair of recording material regulating plates, the width of which can be adjusted according to the size of the recording material P. The sheet feed tray 28 is provided so as to support a recording material P having a size other than standard sizes. Reference numeral 29 is a pickup roller that feeds the recording material P from the sheet feed tray 28, and reference numeral 30 is a motor that drives the fixing apparatus 200, and the like. A control circuit 400, as heater driving means connected to a commercial alternating-current power supply 401, supplies electrical power to the fixing apparatus 200. The photosensitive drum 19, the charging roller 16, the scanner unit 21, the developing roller 17, and the transfer roller 20 form an image forming portion that forms a non-fixed image on the recording material P. In the present embodiment, the photosensitive drum 19, the charging roller 16, a developing unit including the developing roller 17, and a cleaning unit including the drum cleaner 18 are configured as a process cartridge 15 so as to be detachably attached to a main body of the image forming apparatus 100.

The image forming apparatus 100 of the present embodiment is configured such that a largest sheet passing width in a direction orthogonal to the conveying direction of the recording material P is 216 mm, and the image forming apparatus 100 can print 44.3 pages of a standard sheet of a letter (LTR) size (216 mm×279 mm) per minute at a conveying speed of 232.5 mm/sec.

2. Configuration of Image Heating Apparatus

FIG. 2 is a schematic cross-sectional view of the fixing apparatus 200 as the image heating apparatus of the present embodiment. The fixing apparatus 200 includes a fixing film 202 as an endless belt, a heater 300 that makes contact with an inner surface of the fixing film 202, a pressure roller 208 that forms a fixing nip portion N together with the heater 300 with the fixing film 202 interposed therebetween, and a metal stay 204.

The fixing film 202 is a heat-resistant multilayer film formed in a tubular form, and a heat-resistant resin, such as polyimide, or a metal, such as stainless steel, is used as a base layer of the fixing film 202. Moreover, the surface of the fixing film 202 is coated with a heat-resistant resin with excellent releasability, such as a tetrafluoroethylene-perfluoro (alkyl vinyl ether) copolymer (PFA), in order to prevent toner adhesion and to secure separability from the recording material P to thereby form a releasing layer thereon. Furthermore, in an image forming apparatus 100 that forms color images particularly, in order to improve image quality, a heat-resistant rubber, such as silicone rubber, may be formed between the base layer and the releasing layer as an elastic layer. The pressure roller 208 includes a metal core 209 formed of a material, such as iron or aluminum, and an elastic layer 210 formed of a material, such as silicon rubber. The heater 300 is held by a heater holding member 201 formed of a heat-resistant resin, and heats heating regions $A_1$ to $A_7$ (the details will be described later) provided in the fixing nip portion N to thereby heat the fixing film 202. The heater holding member 201 also has a guiding function of guiding rotation of the fixing film 202. An electrode E is provided in the heater 300 on an opposite side of the fixing nip portion N, and electrical power is fed from an electrical contact C to the electrode E. The metal stay 204 receives a pressurizing force (not illustrated) and biases the heater holding member 201 toward the pressure roller 208. Moreover, a safety element 212 that is a thermoswitch, a temperature fuse, or the like, and that is actuated in the event of abnormal heat generation of the heater 300 to interrupt electrical power supplied to the heater 300, is in direct contact with the heater 300 or in indirect contact with the heater 300 with the heater holding member 201 interposed therebetween.

The pressure roller 208 rotates in a direction indicated by arrow R1 in response to motive power from the motor 30. The fixing film 202 rotates in a direction indicated by arrow R2 following the rotation of the pressure roller 208. The heat of the fixing film 202 is applied to the recording material P while being conveyed in a state of being pinched at the fixing nip portion N whereby the non-fixed toner image on the recording material P is fixed. Moreover, in order to secure slidability of the fixing film 202 and to obtain a stable rotation state, a lubricant (not illustrated) having high heat resistance is interposed between the heater 300 and the fixing film 202.

3. Configuration of Heater

A configuration of the heater 300 according to the present embodiment will be described with reference to FIGS. 3A to 3C. FIG. 3A is a cross-sectional view of the heater 300, FIG. 3B is a plan view of respective layers of the heater 300, and FIG. 3C is a diagram for describing a method of connecting the electrical contact C to the heater 300. FIG. 3B illustrates a conveying reference position X of the recording material P in the image forming apparatus 100 of the present embodiment. The conveying reference position X in the present embodiment is set to a center of the recording material P, and the recording material P is conveyed so that a central line in a direction orthogonal to the conveying direction follows the conveying reference position X. Moreover, FIG. 3A is a cross-sectional view of the heater 300 at the conveying reference position X.

The heater 300 includes a ceramic substrate 305, a back surface layer 1 provided on the substrate 305, a back surface layer 2 that covers the back surface layer 1, a sliding surface layer 1 provided on a surface on the opposite side of the back surface layer 1 on the substrate 305, and a sliding surface layer 2 that covers the sliding surface layer 1.

The back surface layer 1 has conductors 301 (301a and 301b) provided along the longitudinal direction of the heater 300. The conductor 301 is divided into the conductors 301a and 301b, and the conductor 301b is disposed on a downstream side in the conveying direction of the recording material P in relation to the conductor 301a. Moreover, the back surface layer 1 has conductors 303 (303-1 to 303-7) provided in parallel to the conductors 301a and 301b. The conductors 303 are provided between the conductors 301a and 301b along the longitudinal direction of the heater 300.

Furthermore, the back surface layer 1 has a heat generating element 302a (302a-1 to 302a-7) and a heat generating element 302b (302b-1 to 302b-7) that are heat generating resistors that generate heat upon energization. The heat generating elements 302a are provided between the conductors 301a and 303 so as to generate heat in response to electrical power supplied via the conductors 301a and 303. The heat generating elements 302b are provided between the conductors 301b and 303 so as to generate heat in response to electrical power supplied via the conductors 301b and 303.

A heat generating portion that includes the conductor 301, the conductor 303, the heat generating element 302a, and the heat generating element 302b is divided into seven heat generating blocks ($HB_1$ to $HB_7$) with respect to the longitudinal direction of the heater 300. That is, the heat generating element 302a is divided into seven regions of heat generating elements 302a-1 to 302a-7 with respect to the longitudinal direction of the heater 300. Moreover, the heat generating element 302b is divided into seven regions of heat generating elements 302b-1 to 302b-7 with respect to the longitudinal direction of the heater 300. Furthermore, the conductor 303 is divided into seven regions of conductors 303-1 to 303-7 in alignment with the dividing positions of the heat generating elements 302a and 302b. The seven heat generating blocks ($HB_1$ to $HB_7$) are configured such that the amounts of energization of heat generating resistors in the respective blocks are controlled individually, whereby the heat generating quantities of the respective heat generating blocks are controlled individually.

In the present embodiment, a heat generating range ranges from the left end in FIG. 3B of the heat generating block $HB_1$ to the right end in FIG. 3B of the heat generating block $HB_7$, and the entire length is 220 mm. Moreover, the longitudinal lengths of respective heat generating blocks are approximately the same as 31 mm, but the lengths may be different from each other.

Moreover, the back surface layer 1 has electrodes E (E1 to E7, E8-1, and E8-2). The electrodes E1 to E7 are provided within the regions of the conductors 303-1 to 303-7, respectively, and are electrodes for supplying electrical power to the heat generating blocks $HB_1$ to $HB_7$ via the conductors 303-1 to 303-7, respectively. The electrodes E8-1 and E8-2 are provided at the ends in the longitudinal direction of the heater 300 so as to be connected to the conductor 301, and are electrodes for supplying electrical power to the heat generating blocks $HB_1$ to $HB_7$ via the conductor 301. In the present embodiment, although the electrodes E8-1 and E8-2 are provided at both ends in the longitudinal direction of the heater 300, the electrode E8-1 only may be provided on one end, for example. Moreover, although electrical power is supplied to the conductors 301a and 301b using a common electrode, individual electrodes may be provided to the conductors 301a and 301b, and electrical power may be supplied via the respective electrodes.

The back surface layer 2 is configured as a surface protection layer 307 having an insulating property (in the present embodiment, formed of glass) and covers the conductor 301, the conductor 303, and the heat generating elements 302a and 302b. Moreover, the surface protection layer 307 is formed in a region outside the portions of the electrodes E so that the electrical contacts C can be connected to the electrodes E from the side of the back surface layer 2 of the heater 300.

The sliding surface layer 1 is provided on a surface of the substrate 305 on the opposite side of a surface on which the back surface layer 1 is provided, and has thermistors TH (TH1-1 to TH1-4 and TH2-5 to TH2-7) as detection means for detecting the temperature of the heat generating blocks $HB_1$ to $HB_7$. Each thermistor TH is formed of a material having PTC characteristics or NTC characteristics (in the present embodiment, NTC characteristics), and can detect the temperature of all heat generating blocks $HB_1$ to $HB_7$ by detecting the resistance thereof.

Moreover, the sliding surface layer 1 has conductors ET (ET1-1 to ET1-4 and ET2-5 to ET2-7) and conductors EG (EG1 and EG2) in order to energize the thermistor TH to detect the resistance thereof. The conductors ET1-1 to ET1-4 are connected to the thermistors TH1-1 to TH1-4, respectively. The conductors ET2-5 to ET2-7 are connected to the thermistors TH2-5 to TH2-7, respectively. The conductor EG1 is connected to four thermistors TH1-1 to TH1-4 to form a common conduction path. The conductor EG2 is connected to three thermistors TH2-5 to TH2-7 to form a common conduction path. The conductors ET and EG are formed up to the longitudinal ends along the longitudinal direction of the heater 300, and are connected to the control circuit 400 via electrical contacts (not illustrated) at the longitudinal ends of the heater 300.

The sliding surface layer 2 is formed of a surface protection layer 308 having slidability and an insulating property (in the present embodiment, formed of glass), and is configured to cover the thermistor TH and the conductors ET and EG, and to secure the ability to slide on the inner surface of the fixing film 202. Moreover, the surface protection layer 308 is formed in a region outside both ends in the longitudinal direction of the heater 300 in order to provide electrical contacts for the conductors ET and EG.

Subsequently, a method of connecting the electrical contacts C to the respective electrodes E will be described. FIG. 3C is a plan view illustrating a state in which the electrical contacts C are connected to the respective electrodes E as seen from the heater holding member 201. Through-holes are formed in the heater holding member 201 at positions corresponding to the electrodes E (E1 to E7, E8-1, and E8-2). At the positions of the respective through-holes, the electrical contacts C (C1 to C7, C8-1, and C8-2) are electrically connected to the electrodes E (E1 to E7, E8-1, and E8-2) by a method such as spring-based biasing or welding. The electrical contacts C are connected to the control circuit 400 (to be described later) of the heater 300 by a conductive material (not illustrated) provided between the metal stay 204 and the heater holding member 201.

4. Configuration of Heater Control Circuit

Figure 4:
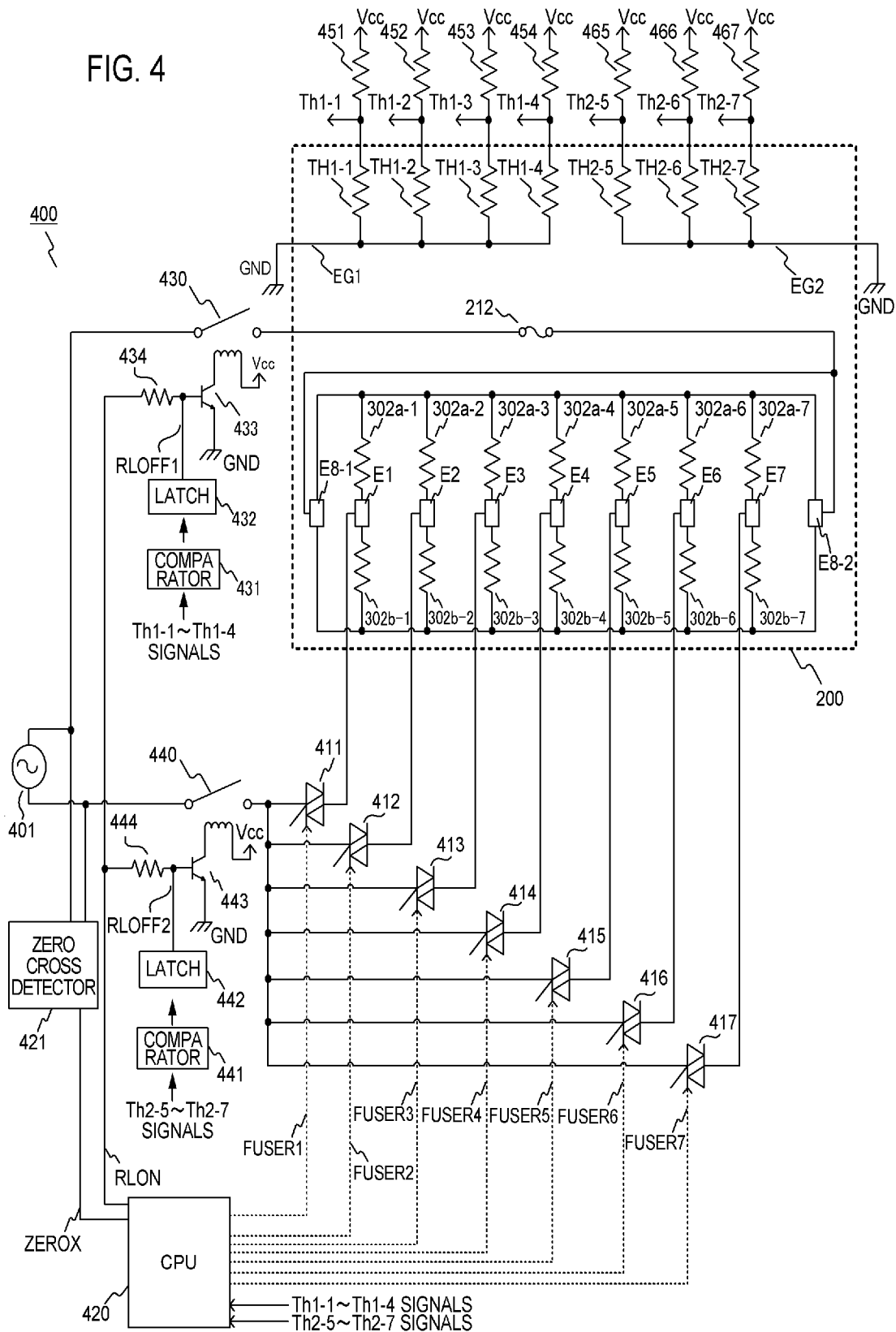
FIG. 4 is a diagram of a heater control circuit according to Embodiment 1.

FIG. 4 illustrates a computer program of the control circuit 400 of the heater 300 according to Embodiment 1. Reference numeral 401 is a commercial alternating-current power supply connected to the image forming apparatus 100. The electrical power supplied to the heater 300 is controlled by energization/de-energization of triacs 411 to 417. The triacs 411 to 417 operate according to signals FUSER1 to FUSER7, respectively, from a CPU 420. The driving circuit of the triacs 411 to 417 is not illustrated. The control circuit 400 of the heater 300 is configured to be able to individually control the seven heat generating blocks $HB_1$ to $HB_7$ using the seven triacs 411 to 417, respectively. A zero cross detector 421 is a circuit that detects zero cross of the alternating-current power supply 401 and outputs a signal ZEROX to the CPU 420. The signal ZEROX is used for detecting the timings of phase or frequency control of the triacs 411 to 417.

A method of detecting the temperature of the heater 300 will be described. The temperature of the heater 300 is detected by the thermistors TH (TH1-1 to TH1-4 and TH2-5 to TH2-7). Voltages divided by the thermistors TH1-1 to TH1-4 and resistors 451 to 454 are detected by the CPU 420 as signals Th1-1 to Th1-4, and the CPU 420 converts the signals Th1-1 to Th1-4 to temperatures. Similarly, voltages divided by thermistors TH2-5 to TH2-7 and resistors 465 to 467 are detected by the CPU 420 as signals Th2-5 to Th2-7, and the CPU 420 converts the signals Th2-5 to Th2-7 to temperatures.

Internal processing of the CPU 420 involves calculating electrical power to be supplied by PI control (proportional integral control), for example, on the basis of control temperatures (control target temperatures) $TGT_i$ of respective heat generating blocks to be described later, and the detection temperatures of the thermistors TH. Furthermore, the CPU 420 converts the electrical power to be supplied to a control level of a phase angle (phase control) or a frequency (frequency control) corresponding to the electrical power, and controls the triacs 411 to 417 according to the control condition. The CPU 420 executes energization control and various operations associated with temperature control of the heater 300 as a control portion and an acquisition portion of the present invention.

Relays 430 and 440 are used as means for interrupting the supply of electrical power to the heater 300 when the temperature of the heater 300 increases excessively due to a fault, or the like. A circuit operation of the relays 430 and 440 will be described. When a signal RLON changes to the High state, a transistor 433 enters into the ON state, a current flows from a supply voltage node Vcc to a secondary-side coil of the relay 430, and a primary-side contact of the relay 430 enters into the ON state. When the signal RLON changes to the Low state, the transistor 433 enters into the OFF state, the current flowing from the supply voltage node Vcc to the secondary-side coil of the relay 430 is interrupted, and the primary-side contact of the relay 430 enters into the OFF state. Similarly, when the signal RLON changes to the High state, a transistor 443 enters into the ON state, a current flows from a supply voltage node Vcc to a secondary-side coil of the relay 440, and a primary-side contact of the relay 440 enters into the ON state. When the signal RLON changes to the Low state, the transistor 443 enters into the OFF state, the current flowing from the supply voltage node Vcc to the secondary-side coil of the relay 440 is interrupted, and the primary-side contact of the relay 440 enters into the OFF state. Resistors 434 and 444 are current limiting resistors.

Next, the operation of a safety circuit that uses the relays 430 and 440 will be described. When any one of the temperatures detected by the thermistors TH1-1 to TH1-4 exceeds a predetermined value set thereto, a comparator 431 operates a latch 432, and the latch 432 latches a signal RLOFF1 to the Low state. When the signal RLOFF1 changes to the Low state, the relay 430 can be maintained in the OFF state (a stable state) since the transistor 433 is maintained in the OFF state even when the CPU 420 puts the signal RLON into the High state. In a non-latched state, the signal RLOFF1 of the latch 432 enters into the open state. When any one of the temperatures detected by the thermistors TH2-5 to TH2-7 exceeds a predetermined value set thereto, a comparator 441 operates a latch 442, and the latch 442 latches a signal RLOFF2 to the Low state. When the signal RLOFF2 changes to the Low state, the relay 440 can be maintained in the OFF state (a stable state) since the transistor 443 is maintained in the OFF state even when the CPU 420 puts the signal RLON into the High state. Similarly, in a non-latched state, the signal RLOFF2 of the latch 442 enters into the open state.

5. Heating Region

Figure 5:
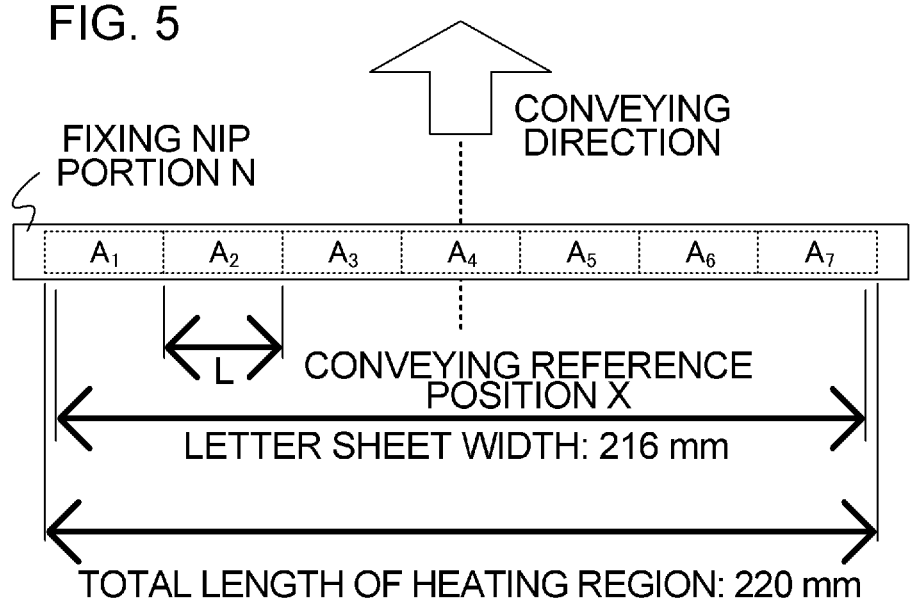
FIG. 5 is a diagram illustrating a heating region according to Embodiment 1.

FIG. 5 is a diagram illustrating heating regions $A_1$ to $A_7$, according to the present embodiment, that are illustrated in comparison with a sheet width of a LETTER (LTR)-size sheet. The heating regions $A_1$ to $A_7$ are provided at positions corresponding to the heat generating blocks $HB_1$ to $HB_7$ in the fixing nip portion N, and the heating regions $A_i$ (i=1 to 7) are heated when the heat generating blocks $HB_i$ (i=1 to 7) generate heat. The entire length of the heating regions $A_1$ to $A_7$ is 220 mm, and the respective regions are obtained by evenly dividing the entire length into seven parts (L=31.4 mm).

Figures 7A, 7B, 7C:
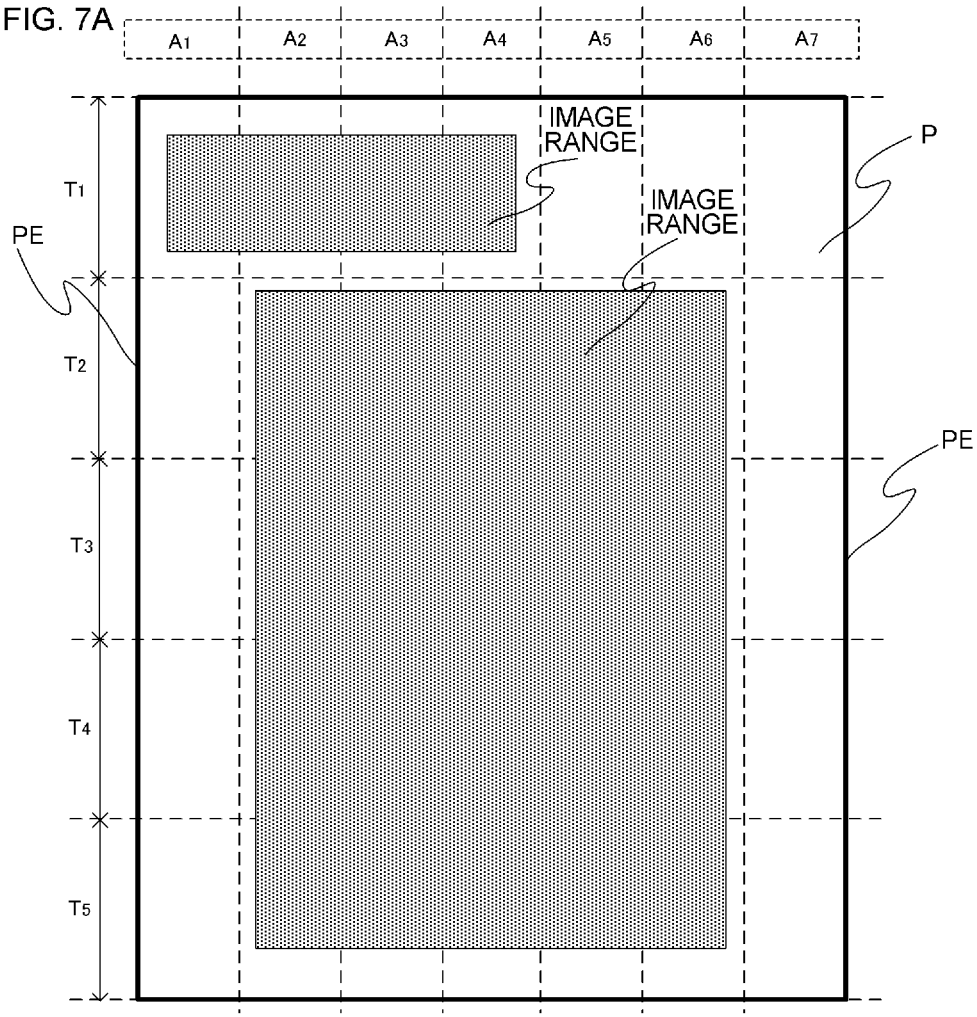
FIGS. 7A to 7C illustrate a specific example of the classification of the heating region according to Embodiment 1.

A specific example of a classification of the heating region $A_i$ will be described with reference to FIGS. 7A to 7C. In the present embodiment, the recording material P passing through the fixing nip portion N is segmented in the conveying direction every predetermined period, and the heating regions $A_i$ are classified in respective segments. In the present embodiment, the recording material P is segmented every 0.24 seconds on the basis of a leading edge thereof as a reference, so that the recording material P is segmented into five segments, such that the first segment is the segment $T_1$, the second segment is the segment $T_2$, the third segment is the segment $T_3$, the fourth segment is the segment $T_4$, and the fifth segment is the segment $T_5$. In a specific example, the recording material P is the LTR-size sheet and passes through the heating regions $A_1$ to $A_7$ in that order. When the recording material and an image are present at the position illustrated in FIG. 7A, the heating regions $A_i$ are classified as illustrated in the tables of FIGS. 7B and 7C.

Each of the heating regions $A_i$ (i=1 to 7) is classified into a recording material edge region AE, a recording material central region AM, an image heating region AI, and a non-image heating region AP. When a recording material edge PE passes through the heating region $A_i$, the heating region $A_i$ is classified as the recording material edge region AE. When a recording material central portion other than the recording material edge PE passes through the heating region $A_i$, the heating region $A_i$ is classified as the recording material central region AM. The recording material edge PE determined herein is an extreme edge PE in the direction orthogonal to the conveying direction of the recording material P as illustrated in FIG. 7A. When an image range passes through the heating region $A_i$, the heating region $A_i$ is classified as the image heating region AI. When a region other than the image range passes through the heating region $A_i$, the heating region $A_i$ is classified as the non-image heating region AP. The classification of the heating region $A_i$ is used for controlling the heat generating quantity of the heat generating block $HB_i$, as will be described later.

That is, by the classification based on the recording material size information, the heating regions $A_1$ and $A_7$ are classified as the recording material edge region AE and the recording material edge PE passes through the heating regions $A_1$ and $A_7$. Moreover, the heating regions $A_2$, $A_3$, $A_4$, $A_5$, and $A_6$ are classified as the recording material central region AM. A heat generating element that forms the heating regions $A_1$ and $A_7$ corresponds to a first heat generating element of the present invention, and a heat generating element that forms the heating regions $A_2$, $A_3$, $A_4$, $A_5$, and $A_6$ corresponds to a second heat generating element of the present invention. Moreover, according to image data (image information), in the segment $T_1$, the heating regions $A_1$, $A_2$, $A_3$, and $A_4$ are classified as the image heating region AI since the image range passes through the heating regions $A_1$, $A_2$, $A_3$, and $A_4$, and the heating regions $A_5$, $A_6$, $A_7$ are classified as the non-image heating region AP since the image range does not pass through the heating regions $A_5$, $A_6$, and $A_7$. In the segments $T_2$ to $T_5$, the heating regions $A_2$, $A_3$, $A_4$, $A_5$, and $A_6$ are classified as the image heating region AI since the image range passes through the heating regions $A_2$, $A_3$, $A_4$, $A_5$, and $A_6$, and the heating regions $A_1$ and $A_7$ are classified as the non-image heating region AP since the image range does not pass through the heating regions $A_1$ and $A_7$.

6. Overview of Heater Control Method

Next, a heater control method according to the present embodiment (that is, a method of controlling the heat generating quantity of the heat generating block $HB_i$ (i=1 to 7)) will be described. The heat generating quantity of the heat generating block $HB_i$ is determined by the electrical power supplied to the heat generating block $HB_i$. The heat generating quantity of the heat generating block $HB_i$ increases when the electrical power supplied to the heat generating block $HB_i$ is increased, and the heat generating quantity of the heat generating block $HB_i$ decreases when the electrical power supplied to the heat generating block $HB_i$ is decreased. The electrical power supplied to the heat generating block $HB_i$ is calculated on the basis of the control temperatures $TGT_i$ (i=1 to 7) set to respective heat generating blocks and the temperature detected by the thermistor. In the present embodiment, the supplied electrical power is calculated by PI control (proportional integral control), so that the temperatures detected by the respective thermistors are equal to the control temperatures $TGT_i$ of the respective heat generating blocks $HB_i$. The control temperatures $TGT_i$ of the respective heat generating blocks $HB_i$ are set according to the classification of the heating regions $A_i$ determined by the flow of FIG. 6.

Figure 6:
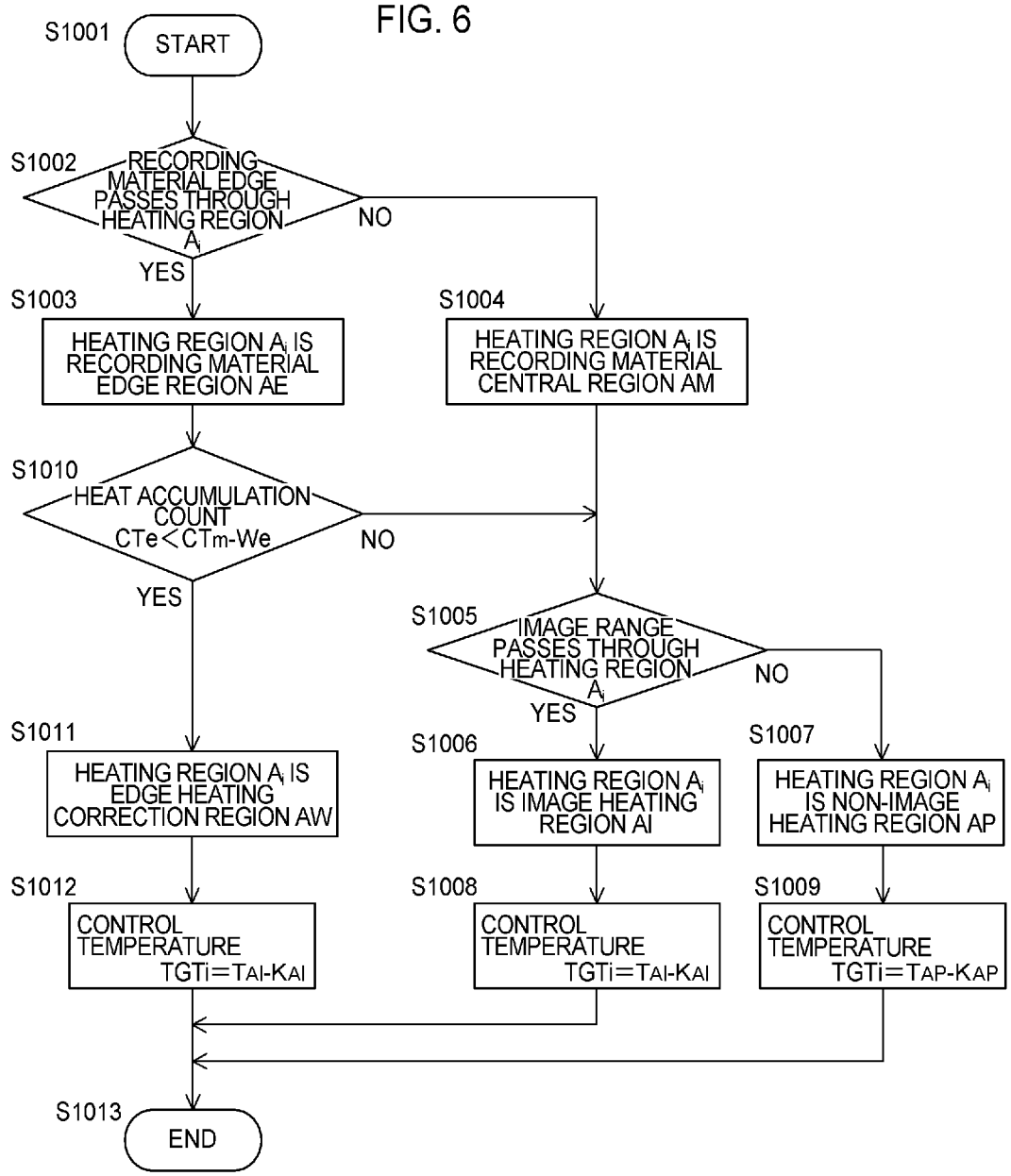
FIG. 6 is a flowchart for determining a classification and a control temperature of a heating region according to Embodiment 1.

FIG. 6 is a flowchart for determining a classification and a control temperature of the heating region according to the present embodiment. As illustrated in the flowchart of FIG. 6, the respective heating regions $A_i$ (i=1 to 7) are classified into the recording material edge region AE, the recording material central region AM, the image heating region AI, the non-image heating region AP, and a recording material edge heating correction region AW. The heating region $A_i$ is classified on the basis of image data (image information) and recording material information (a recording material size) sent from an external apparatus (not illustrated), such as a host computer.

That is, on the basis of the size information of a recording material P, it is determined whether the heating region $A_i$ is a region through which the recording material edge PE passes, or a region through which a region other than the recording material edge PE passes (S1002). When the recording material edge PE passes through the heating region $A_i$, the heating region $A_i$ is classified as the recording material edge region AE (S1003). When the recording material central portion other than the recording material edge PE passes through the heating region $A_i$, the heating region $A_i$ is classified as the recording material central region AM (S1004). Subsequently, it is determined whether the heating region $A_i$ classified as the recording material central region AM is an image range on the basis of the image data (image information) (S1005). When the heating region $A_i$ is the image range, the heating region $A_i$ is classified as the image heating region AI (S1006). When the heating region $A_i$ is not the image range, the heating region $A_i$ is classified as the non-image heating region AP (S1007). The classification of the heating region $A_i$ is used for controlling the heat generating quantity of the heat generating block $HB_i$, as will be described later. When the heating region $A_i$ is classified as the image heating region AI (S1006), the control temperature $TGT_i$ is set as $TGT_i=T_{AI}-K_{AI}$ (S1008).

Here, $T_{AI}$ is a reference temperature of the image heating region AI, and is set as a temperature appropriate for fixing a non-fixed image to the recording material P. When a standard sheet is passed in the fixing apparatus 200 of the present embodiment, $T_{AI}$ is set to 198° C. The reference temperature $T_{AI}$ of the image heating region AI is preferably variable according to the type of the recording material P, such as a thick paper or a thin paper. Moreover, the reference temperature $T_{AI}$ of the image heating region may be adjusted according to image information, such as an image density or a pixel density.

Moreover, $K_{AI}$ is a temperature correction term of the image heating region AI, and is set according to a heat accumulation count value $CT_i$ in each heating region $A_i$ as illustrated in FIG. 8A. Here, the heat accumulation count value $CT_i$ is a parameter correlated with a heat accumulation amount of the fixing apparatus 200 in each heating region $A_i$, and the greater the heat accumulation count value $CT_i$, the greater the heat accumulation amount. A method of calculating the heat accumulation count value $CT_i$ will be described later.

A heat amount for fixing a toner image to the recording material P, however, is given by the heat generating quantity of the heat generating block $HB_i$ and the heat accumulation amount in the heating region $A_i$. That is, the greater the heat accumulation amount in the heating region $A_i$, the more the toner image is likely to be fixed to the recording material P even if the heat generating quantity of the heat generating block $HB_i$ is small. Therefore, in the image forming apparatus 100 of the present embodiment, the greater the heat accumulation amount (heat accumulation count value $CT_i$), the greater the set temperature correction term $K_{AI}$ of the image heating region AI, so that the control temperature $TGT_i$ is decreased and the heat generating quantity of the heat generating block $HB_i$ is decreased. By doing so, an excessive heat amount is prevented from being applied to the toner image when the heat accumulation amount in the heating region $A_i$ is large, thereby realizing power saving.

Next, a case in which the heating region $A_i$ is classified as the non-image heating region AP (S1007) will be described. When the heating region $A_i$ is classified as the non-image heating region AP, the control temperature $TGT_i$ is set as $TGT_i=T_{AP}-K_{AP}$ (S1009).

Here, $T_{AP}$ is a reference temperature of the non-image heating region AP, and is set as a temperature less than the reference temperature $T_{AI}$ of the image heating region AI, so that the heat generating quantity of the heat generating block $HB_i$ in the non-image heating region AP is less than that of the image heating region AI to realize power saving of the image forming apparatus 100. If the reference temperature $T_{AP}$ of the non-image heating region AP is decreased too much, however, there may be case in which it is difficult to perform heating sufficiently up to the control temperature of the image portion even if a greatest possible electrical power is supplied to the heat generating block $HB_i$ when the heating region $A_i$ is changed from the non-image heating region AP to the image heating region AI. In this case, since there is a possibility that a phenomenon (a fixing defect) in which the toner image is not sufficiently fixed to the recording material P occurs, it is necessary to set the reference temperature $T_{AP}$ of the non-image heating region AP to an appropriate value. According to the test performed by present inventors, it has found that, in the image forming apparatus 100 of the present embodiment, when the reference temperature $T_{AP}$ of the non-image heating region AP is set to 158° C. or greater, and the heating region $A_i$ is changed from the non-image heating region AP to the image heating region AI, a fixing defect did not occur. From the viewpoint of power saving, since it is preferable to decrease the control temperature $TGT_i$ as much as possible to decrease the heat generating quantity of the heat generating block $HB_i$, $T_{AP}$ is set to 158° C. in the present embodiment. The reference temperature $T_{AP}$ of the non-image heating region AP is preferably variable according to the type of the recording material P, such as a thick paper or a thin paper. Moreover, the reference temperature $T_{AP}$ of the non-image heating region AP may be adjusted according to image information, such as an image density or a pixel density.

Moreover, $K_{AP}$ is a temperature correction term of the non-image heating region AP, and as illustrated in FIG. 8B, the greater the heat accumulation count value $CT_i$ in each heating region $A_i$ (that is, the greater the heat accumulation amount in each heating region $A_i$), the greater the set temperature correction term $K_{AP}$ of the non-image heating region AP. A heat amount necessary for causing the temperature of the heater 300 to reach up to the control temperature $TGT_i$ of the image portion when the heating region $A_i$ changes, however, from the non-image heating region AP to the image heating region AI, and is given by the heat generating quantity of the heat generating block $HB_i$ and the heat accumulation amount in the heating region $A_i$. That is, when a largest possible electrical power is supplied to the heat generating block $HB_i$ (when the supplied electrical power is constant), the greater the heat accumulation amount in the heating region $A_i$, the quicker the temperature of the heater 300 can reach the control temperature $TGT_i$ of the image portion. The expression that the temperature can reach the control temperature $TGT_i$ of the image portion means that, even if the control temperature $TGT_i$ of the non-image heating region AP is decreased, it is possible to perform heating sufficiently up to the control temperature $TGT_i$ of the image portion, and to prevent the occurrence of a fixing defect. Therefore, in the image forming apparatus 100 of the present embodiment, the greater the heat accumulation amount (the heat accumulation count value $CT_i$), the greater the set temperature correction term $K_{AP}$ of the non-image heating region AP, so that the control temperature $TGT_i$ is decreased and the heat generating quantity of the heat generating block $HB_i$ is decreased. By doing so, an excessive heat amount is prevented from being applied to the fixing apparatus 200 when the heat accumulation amount in the heating region $A_i$ is large, thereby realizing power saving.

Next, a case in which the heating region $A_i$ is classified as the recording material edge region AE (S1003) will be described. In S1010, it is determined whether a heat accumulation count value $CT_e$ (first count value) of the recording material edge region AE satisfies Expression 1 below:

$$CT_e < CT_m - W_e \qquad \text{(Expression 1).}$$

$CT_m$ is a heat accumulation count value (second count value) of each heating region $A_i$ in the recording material central region AM, and $W_e$ is a determination value (predetermined value) for determining the occurrence of a conveying defect at the recording material edge PE.

Next, S1010 will be described in detail. In S1010, it is determined whether the image heating apparatus 200 is in a state in which paper wrinkle as a recording material conveying defect occurs. As described above, the heat accumulation count value CT is a parameter correlated with the heat accumulation amount of the fixing apparatus 200 in each heating region, and the greater the heat accumulation count value, the greater heat accumulation amount. Therefore, the greater the heat accumulation count value CT, the greater the heat accumulation amount of the pressure roller 208 that is a fixing member of the image heating apparatus 200.

The pressure roller 208 has the silicon rubber layer 210 that is an elastic layer formed on the metal core 209 thereof. When the heat accumulation amount is large, the silicon rubber layer thermally expands and the outer diameter of the pressure roller 208 increases. In the fixing apparatus 200 of the present embodiment, the recording material P is conveyed according to rotation of the pressure roller 208. Therefore, the greater the heat accumulation count value CT, the more the pressure roller 208 expands, the greater the outer diameter, and the greater the conveying force of the recording material. In this manner, the heat accumulation count value CT is correlated with the conveying force of the recording material P.

Figures 10A, 10B, 10C:
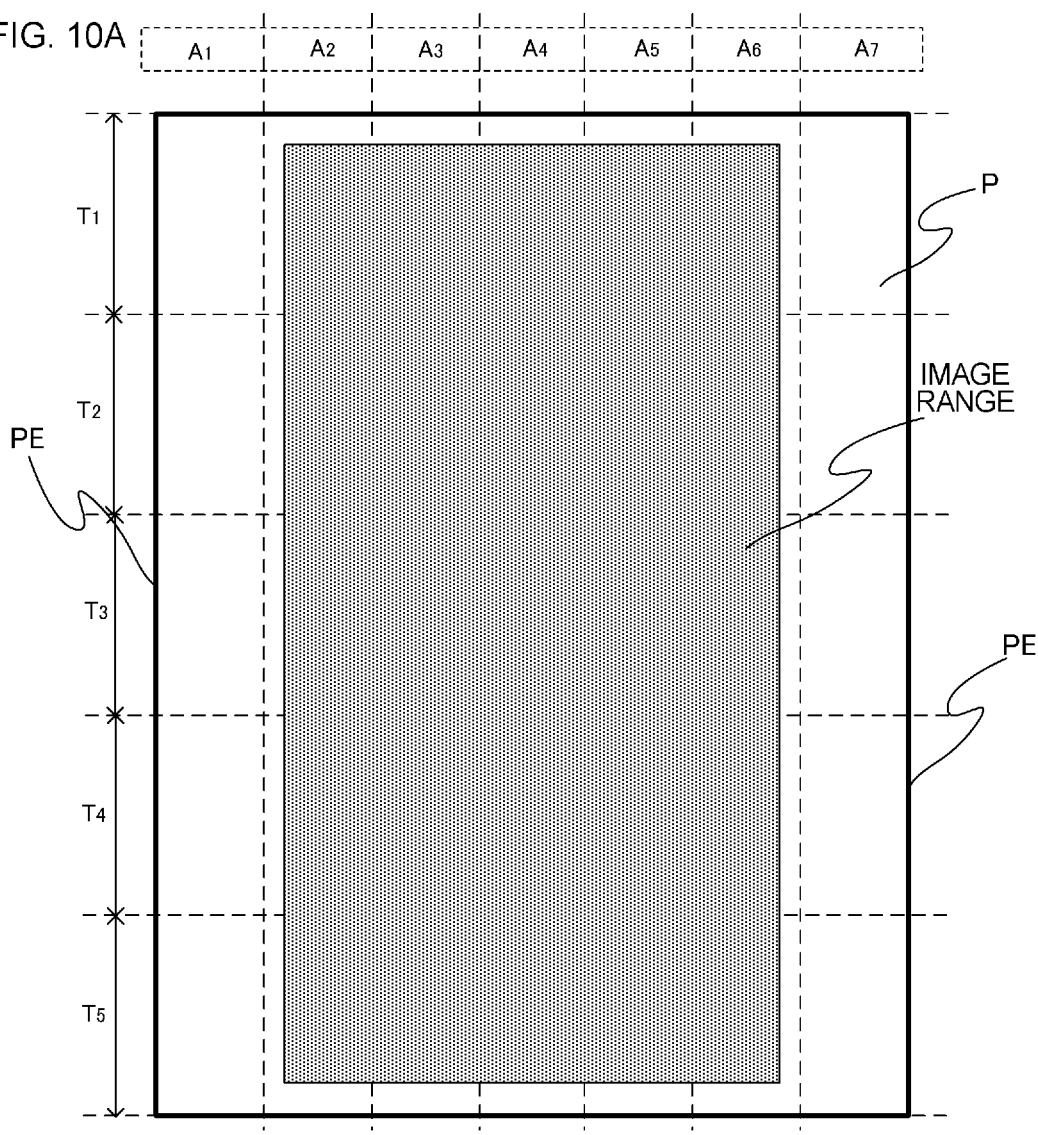
FIGS. 10A to 10C are diagrams for describing specific exemplary recording materials according to Embodiment 1.

On the other hand, as means for suppressing a paper wrinkle of a recording material P, the pressure roller 208 of the present embodiment is configured such that the outer diameter at the end thereof is greater by approximately 100 µm than the outer diameter in the central portion thereof. This is to set the conveying force at the end of the pressure roller 208 to be greater than the conveying force in the central portion, so as to apply a force of pulling the recording material P from the recording material central region toward the recording material edge PE to thereby prevent a paper wrinkle of the recording material P. For example, when such an image pattern as illustrated in FIGS. 10A to 10C is continuously formed, since the heat generating quantity of the image heating region AI increases, the heat accumulation amount (heat accumulation count value $CT_m$) of the central region is greater than the heat accumulation amount (heat accumulation count value $CT_e$) of the edge region. Therefore, with a change in the heat accumulation amount, the outer diameter of the pressure roller 208 in the central region changes more greatly than the outer diameter of the pressure roller 208 in the edge region. Due to a change in the conveying force resulting from a change in the heat accumulation amount, the effect of suppressing a paper wrinkle of the recording material P by the force of pulling the recording material P from the recording material central region toward the recording material edge PE decreases.

When the heat accumulation count value $CT_e$ becomes less than the heat accumulation count value $CT_m$ by the determination value $W_e$ or more that is a value for determining the occurrence of a conveying defect at the recording material edge as illustrated in Expression 1 in S1010 of the control flow, a paper wrinkle of the recording material P may occur due to the above-described change. In the present embodiment, the determination value $W_e$ is set to 150. The determination value $W_e$ is set such that the paper wrinkle of the recording material P is within an allowable range. The determination value $W_e$ is preferably variable according to the type (paper weight) of the recording material P, such as a thick paper or a thin paper. Moreover, the determination value $W_e$ may be adjusted according to a use environment (temperature or humidity).

When the determination criterion of S1010 is not satisfied (that is, a difference obtained by subtracting the heat accumulation count value $CT_e$ as the first count value from the heat accumulation count value $CT_m$ as the second count value is greater than the determination value $W_e$ as the predetermined value), the flow proceeds to S1005. Moreover, the heating region $A_i$ is classified into the image heating region AI and the non-image heating region AP similarly to the recording material central region AM (S1006 and S1007), and the control temperature $TGT_i$ is determined according to the classification (S1008 and S1009).

When the determination criterion of S1010 is satisfied (that is, the difference obtained by subtracting the heat accumulation count value $CT_e$ from the heat accumulation count value $CT_m$ is equal to or less than the predetermined value (that is, the count value $W_e$)), the heating region $A_i$ is classified as the recording material edge heating correction region AW (S1011)). When the heating region $A_i$ is classified as the recording material edge heating correction region AW, the control temperature $TGT_i$ is set so that a paper wrinkle does not occur. In S1012, regardless of whether the image range passes through the heating region $A_i$, the control temperature $TGT_i$ is set as $TGT_i = T_{AI} - K_{AI}$ (S1012). $T_{AI}$ is the reference temperature of the image heating region AI, and $K_{AI}$ is the temperature correction term of the image heating region AI similarly to S1008. In the present embodiment, when a standard sheet is passed, $T_{AI}$ is set to 198° C.

By the above-described setting, even when such an image as the image pattern illustrated in FIGS. 10A to 10C does not pass through the heating correction region AW at the edge of the recording material P, heating is performed in a level equivalent to the image heating region AI of the recording material central region AM. By doing so, it is possible to suppress an increase in the difference between the edge heat accumulation count value $CT_e$ and the central portion heat accumulation count value $CT_m$ so as to be maintained within a predetermined range. Therefore, it is possible to maintain a paper wrinkle suppression effect and to prevent the occurrence of a paper wrinkle of a recording material P.

As for the heat generating quantity control temperature $TGT_i$ of the heat generating block $HB_i$, in an inter-sheet interval when a plurality of images are printed continuously (a segment between a preceding recording material and a subsequent recording material), the control temperature is set as $TGT_i = T_{AP} - K_{AP}$ by applying the same idea as the non-image heating region AP. As for the heat generating quantity control temperature $TGT_i$ of the heat generating block $HB_i$ at a post-rotation (an idling segment until the printer enters into a print standby state after the recording material P at the end of printing passed through the heating region $A_i$), the control temperature is set as $TGT_i=T_{AP}-K_{AP}$ by applying the same idea as the non-image heating region AP.

A method of controlling the heat generating quantity of the heat generating block $HB_i$ at the time of pre-rotation (startup segment) will be described. Here, the pre-rotation is an idling segment before the recording material P at the start of printing reaches the heating region $A_i$ and is a segment in which control is performed so that the temperature of the heating region $A_i$ reaches a predetermined temperature. In the image forming apparatus 100 of the present embodiment, the control temperature $TGT_i$ during a startup operation is given by Expression 2 below:

$$TGT_i=(T_{AI}-K_{AI}-T0_i) \div 3 \times t + T0_i \qquad \text{(Expression 2)}.$$

In Expression 2, $T_{AI}$ is the reference temperature of the image heating region AI, and $K_{AI}$ is the temperature correction term of the image heating region AI. Moreover, t represents the time (seconds) elapsed from the start of a startup operation, and $T0_i$ represents the temperature detected by the thermistor TH corresponding to the heating region $A_i$ at the start of the startup operation. That is, the control temperature $TGT_i$ is changed linearly from $T0_i$ to $T_{AI}-K_{AI}$ every three seconds.

As described above, in the present embodiment, the control temperature $TGT_i$ of the respective heating regions $A_i$ is determined according to the classification and the heat accumulation count value $CT_i$ of the heating region $A_i$. The setting values of the reference temperature ($T_{AI}$ and $T_{AP}$) of each heating region $A_i$, the temperature correction term (KAI and $K_{AP}$) of each heating region $A_i$, and the determination value $W_e$ are to be determined appropriately by taking the configuration of the image forming apparatus 100 and the fixing apparatus 200 and the printing conditions into consideration. That is, these values are not limited to the above-described values.

7. Predicted Heat Accumulation Amount Calculation Method

In the present embodiment, the heat accumulation count value $CT_i$ is provided for respective heating regions $A_i$ as a parameter correlated with the heat accumulation amount of each heating region $A_i$. The heat accumulation count value $CT_i$ indicates how much the respective heating regions $A_i$ are heated and how much heat the respective heating regions $A_i$ have radiated and is used for predicting the heat accumulation amount by storing and counting the thermal history (heating history and heat radiation history). The heating history can be acquired, for example, on the basis of at least one of a heater temperature and the amount of electrical power supplied to the heat generating element. Moreover, the heat radiation history can be acquired, for example, on the basis of at least one of whether the recording material P has passed through the heating region $A_i$, a period in which electrical power is not supplied to the heat generating element, and a change over time in the heater temperature. $dCT_i$, given by Expression 3 below, is accumulated and added to the heat accumulation count value $CT_i$ of each heating region $A_i$ every predetermined update timing:

$$dCT_i=(TC-RMC-DC)+WUC \qquad \text{(Expression 3)}.$$

Here, TC, RMC, DC, and WUC in Expression 3 will be described with reference to FIGS. 9A to 9D. It is assumed that the heat accumulation count value $CT_i$ of the present embodiment is updated every 0.24 seconds (every classification segment of the heating region $A_i$) on the basis of the leading edge of the recording material P as a reference except for the pre-rotation at the start of printing. Moreover, in a standby state in which a printing operation is not performed, the heat accumulation count value $CT_i$ is updated every 0.24 seconds on the basis of the time point at which energization of the heater 300 ended at the end of the printing operation as a reference.

TC in Expression 3 is a value indicating a heating amount of the heating region $A_i$ by the heat generating block $HB_i$ and is calculated on the basis of the control temperature of the heater 300 and the amount of electrical power supplied to each heat generating element. In Embodiment 1, TC is determined according to the control temperature $TGT_i$ of each heating region $A_i$ as illustrated in FIG. 9A. The lesser the control temperature $TGT_i$, the lesser the TC value, and the greater the control temperature $TGT_i$, the greater the TC value.

RMC in Expression 3 indicates a heat amount deprived from the image heating apparatus 200 by the recording material P and is set according to a passing state (the presence of passing or the like) of the recording material P in each heating region $A_i$ as illustrated in FIG. 9B. When the recording material P is not present in the heating region $A_i$ (that is, the heating region $A_i$ is classified as the heating region AN of a non-sheet-passing portion, RMC is set as 0). The RMC may be variable according to the type of the recording material P, such as a thick paper or a thin paper.

DC in Expression 3 indicates the amount of heat radiated outside the fixing apparatus 200 by heat transfer or radiation, and is determined according to the heat accumulation count value $CT_i$ of each heating region. Since the greater the heat accumulation amount, the greater the temperature difference from the outside temperature, and the greater the heat radiation amount, the greater the heat accumulation count value $CT_i$, the greater the DC value, as illustrated in FIG. 9C.

Updating of the heat accumulation count value $CT_i$ on the basis of TC, RMC, and DC is performed at the $CT_i$ update interval of 0.24 seconds in an inter-sheet interval when a plurality of images are printed continuously. Moreover, the heat accumulation count value $CT_i$ is updated at the $CT_i$ update interval of 0.24 seconds in a standby segment in which a printing operation is not performed at the time of post-rotation at the end of printing. When the inter-sheet interval, the post-rotation, or the standby segment ends in the middle of the period of 0.24 seconds, an addition/subtraction amount of TC, RMC, or DC is adjusted. For example, since an inter-sheet interval time in Embodiment 1 is 0.12 seconds, which is half the $CT_i$ update interval of 0.24 seconds, the heat accumulation count value $CT_i$ is updated using TC, RMC, and DC, which are half the values illustrated in FIGS. 9A to 9C. Moreover, for example, since the post-rotation time in Embodiment 1 is 0.12 seconds similarly to the inter-sheet interval time, the heat accumulation count value $CT_i$ is updated using TC, RMC, and DC, which are half the values illustrated in FIGS. 9A to 9C. Moreover, when the heat accumulation count value $CT_i$ obtained as the result of updating the heat accumulation count value $CT_i$ is smaller than 0, the heat accumulation count value $CT_i$ is set to 0.

WUC in Expression 3 indicates an addition amount of the heat accumulation count value $CT_i$ at the time of pre-rotation (startup segment). At the time of pre-rotation, the heat accumulation count value $CT_i$ is not added or subtracted using TC, RMC, and DC. The heat accumulation count value $CT_i$ is added using WUC at a time point (a leading edge time point of the recording material P) at which the pre-rotation ends. As illustrated in FIG. 9D, the greater the heat accumulation count value $CT_i$, the lesser the set WUC value.

The heat accumulation count value $CT_i$ determined in the above-described manner shows that the greater the heat accumulation count value $CT_i$, the greater the heat accumulation amount in the heating region $A_i$. The setting values of TC, RMC, DC, and WUC are to be determined appropriately by taking the configuration of the image forming apparatus 100 and the fixing apparatus 200 and the printing conditions into consideration, and are not limited to the values illustrated in FIGS. 9A to 9D.

8. Advantages of Present Invention

Advantages of the present embodiment will be described using a comparative example. FIG. 11 illustrates a control flow of the comparative example. As illustrated in FIG. 11, in the comparative example, the heating region $A_i$ is classified as either the image heating region AI or the non-image heating region AP (S1022 to S1024) and the control temperatures $TGT_i$ of the respective regions are set (S1025 and S1026). In the comparative example, the control temperatures $TGT_i$ of the image heating region AI and the non-image heating region AP are set the same as those of Embodiment 1.

Next, the advantages of the present invention will be described by way of a specific example of Embodiment 1 to be described later as a specific printing example. In the specific example of Embodiment 1, in a state in which the fixing apparatus 200 is in a room-temperature state (that is, a state in which the heat accumulation count value $CT_i$ of each heating region $A_i$ is 0), 100 pages of a recording material (LTR size: a sheet width of 216 mm, a sheet length of 279 mm, and a paper weight of 75 g/m$^2$) illustrated in FIGS. 10A to 10C were printed continuously. It is assumed that the printed image is disposed in the entire range in which the image passes through the heating regions $A_2$, $A_3$, $A_4$, $A_5$, and $A_6$ on the recording material P.

FIG. 12A illustrates a change in the heat accumulation count value $CT_i$ of the heating region $A_i$ with respect to the number of passing recording materials in Embodiment 1.

Moreover, FIG. 12B illustrates a control temperature $TGT_i$ corresponding to the number of passing sheets, a heat accumulation count value $CT_i$, and the occurrence of a paper wrinkle in the printed recording material P.

In FIG. 12A, a solid line indicates a change in the heat accumulation count values $CT_2$ to $CT_6$ of the heating regions ($A_2$, $A_3$, $A_4$, $A_5$, and $A_6$) classified as the recording material central region AM and the image heating region AI in Embodiment 1. A two-dot chain line indicates a change in the heat accumulation count values $CT_1$ and $CT_7$ of the heating regions ($A_1$ and $A_7$) classified as the recording material edge region AE and the non-image heating region AP in Embodiment 1. Moreover, a broken line indicates a change in the heat accumulation count values $CT_1$ and $CT_7$ of the heating regions $A_1$ and $A_7$ in the comparative example. Since the heat accumulation count values of the heating regions $A_2$, $A_3$, $A_4$, $A_5$, and $A_6$ in the comparative example show the same change as Embodiment 1, the description thereof will be omitted.

In the heating regions ($A_2$, $A_3$, $A_4$, $A_5$, and $A_6$) classified as the recording material central region AM in Embodiment 1, the heat accumulation count values $CT_2$ to $CT_6$ increase as the number of printed pages increases. Since the heating regions ($A_2$, $A_3$, $A_4$, $A_5$, and $A_6$) are classified as the image heating region AI, the temperature $T_{AI}$ of the image heating region AI is set to 198° C., and the heat accumulation count values $CT_2$ to $CT_6$ of the 39th page reach 185.

Moreover, since the heating regions ($A_1$ and $A_7$) classified as the recording material edge region AE are also classified as the non-image heating region AP, the temperature $T_{AP}$ of the image heating region AI is set to 158° C. Therefore, although the heat accumulation count values $CT_1$ and $CT_7$ increase as the number of printed pages increases, since the heat generating quantity of the heat generating block $HB_i$ is decreased, the heat accumulation count values $CT_1$ and $CT_7$ do not increase to be greater than the heat accumulation count values $CT_2$ to $CT_6$ of the recording material central region AM. The heat accumulation count values $CT_1$ and $CT_7$ of the 39th page reach 33. As described above, the determination value $W_e$ is set to 150. Therefore, the condition of Expression 1 illustrated in S1010 of the control flow of FIG. 6 is satisfied when the number of passing sheets reaches 39. Therefore, the heating regions ($A_1$ and $A_7$) in the 39th and subsequent pages are classified as the heating correction region AW of the recording material edge and the control temperature $TGT_i$ is set as $TGT_i = T_{AI} - K_{AI}$. The control temperature $TGT_i$ is set to 198° C.

As illustrated in FIG. 12A, for the 39th and subsequent pages, the heat accumulation count values $CT_1$ and $CT_7$ increase substantially similarly to the heat accumulation count values $CT_2$ to $CT_6$ corresponding to the recording material central region AM. Therefore, as illustrated in FIG. 12B, the difference in the heat accumulation count value of the recording material edge region AE and the recording material central region AM is maintained to approximately 150 and is maintained within a predetermined range without increasing to a certain level or higher.

Although the pressure roller 208 of the present embodiment is configured such that the outer diameter at the ends is greater by approximately 100 μm than the outer diameter at the central portion, a paper wrinkle can be suppressed when the outer diameter difference is maintained to 70 μm or more. Although the heat accumulation count value $CT_i$ is a parameter correlated with the outer diameter of the pressure roller 208, the heat accumulation count value difference of 150 corresponds to a pressure roller outer diameter difference of 30 μm. Therefore, in such a printing example as the specific example of Embodiment 1, although the pressure roller outer diameter difference decreases, the outer diameter difference can be maintained to 70 μm or more. Therefore, in Embodiment 1, the pressure roller outer diameter difference in the recording material edge region AE and the recording material central region AM can be maintained within a certain range and the occurrence of a paper wrinkle can be suppressed.

In the comparative example, as illustrated in FIGS. 12A and 12C, a difference in the heat accumulation amount of the recording material edge region AE and the recording material central region AM increases as the number of passing sheets increases and reaches 231 when the number of passing sheets reaches 70. Therefore, in the comparative example, the outer diameter difference at the central portion and the end of the pressure roller decreases up to 60 μm or less when the number of passing sheets reaches 70. Therefore, the pressure roller outer diameter in the recording material central region AM becomes greater by a predetermined range or more than the outer diameter in the recording material edge region AE and a paper wrinkle suppression effect decreases. As a result, a paper wrinkle occurs.

As described above, in the present embodiment, the difference in the heat accumulation amount of the recording material edge region AE and the recording material central region AM does not increase up to a certain level or more. Therefore, it is possible to maintain the outer diameter difference of the pressure roller to be within a certain range and to suppress the occurrence of a paper wrinkle. Moreover, by changing the control temperature $TGT_i$ between the image heating region AI and the non-image heating region AP, it is possible to decrease the heat generating quantity of the non-image heating region AP and to achieve power saving.

In the present embodiment, a heating region of the heat generating element disposed at the first stage in the longitudinal direction of the plurality of heat generating elements is determined as the recording material edge region AE, and a heating region of the heat generating element other than the heat generating element is determined as the recording material central region AM. The present invention is not limited, however, to such a configuration. That is, depending on the correspondence between the number of arranged heat generating elements and the size in the longitudinal direction of the recording material, a heating region of a heat generating element disposed on the inner side than the first stage may be determined as the recording material edge region AE. In this case, a heating region of a heat generating element disposed on the inner side in the longitudinal direction than the heat generating element, the heating region of which is determined as the recording material edge region AE, is determined as the recording material central region AM.

Embodiment 2

Embodiment 2 of the present invention will be described. In Embodiment 2, the heat accumulation count values CT that indicate the thermal history between the recording material edge region AE and the recording material central region AM are compared, and the control temperature of the image heating region AI and the control temperature of the non-image heating region AP in the recording material edge region are changed according to the comparison result using a paper wrinkle correction term. A basic configuration and operations of the image forming apparatus 100 and the image heating apparatus 200 of Embodiment 2 are the same as those of Embodiment 1. Therefore, elements of Embodiment 2 having the same or corresponding function and configuration as those of Embodiment 1 are denoted by the same reference numerals and the description thereof will be omitted. Matters that are not particularly described in Embodiment 2 are similar to those of Embodiment 1.

Figure 13A:
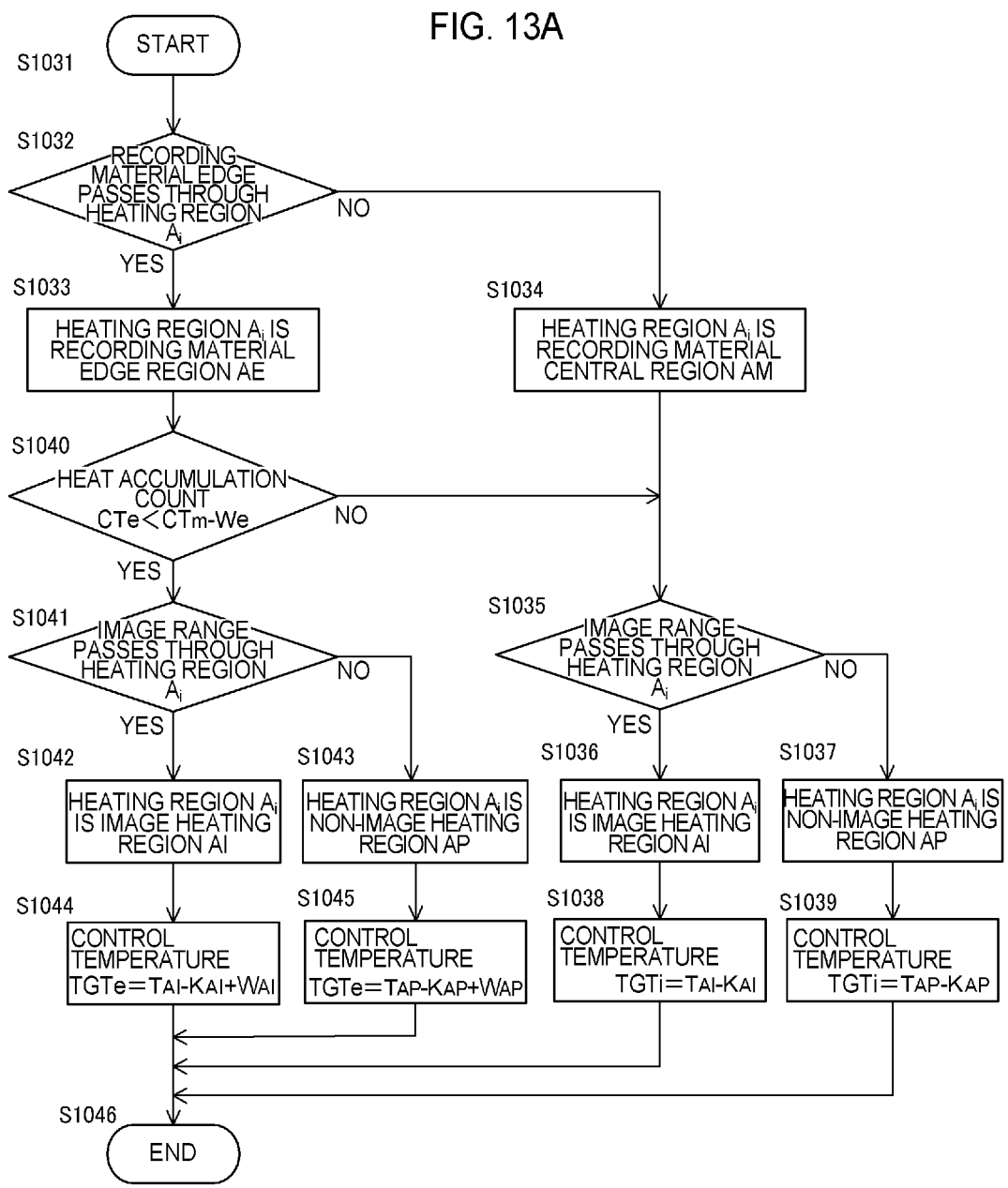
FIG. 13A is a flowchart for determining a classification and a control temperature of a heating region according to Embodiment 2.

FIG. 13A is a flowchart for determining a classification and a control temperature of a heating region $A_i$ according to Embodiment 2. FIGS. 13B and 13C illustrate setting values of parameters associated with the control temperature according to Embodiment 2. As illustrated in the flowcharts of FIG. 13A, each of the heating regions $A_i$ (i=1 to 7) is classified into a recording material edge region AE, a recording material central region AM, an image heating region AI, and a non-image heating region AP. The heating region $A_i$ is classified on the basis of image data (image information) and recording material information (a recording material size) sent from an external apparatus (not illustrated), such as a host computer.

That is, on the basis of the size information of a recording material P, it is determined whether the heating region $A_i$ is a region through which the recording material edge PE passes or a region through which a region other than the recording material edge passes (S1032). When the recording material edge PE passes through the heating region $A_i$, the heating region $A_i$ is classified as the recording material edge region AE (S1033). When the recording material central portion other than the recording material edge PE passes through the heating region $A_i$, the heating region $A_i$ is classified as the recording material central region AM (S1034). Subsequently, it is determined whether the heating region $A_i$ classified as the recording material central region AM is an image range on the basis of the image data (image information) (S1035). When the heating region $A_i$ is the image range, the heating region $A_i$ is classified as the image heating region AI (S1036). When the heating region $A_i$ is not the image range, the heating region $A_i$ is classified as the non-image heating region AP (S1037). The classification of the heating region $A_i$ is used for controlling the heat generating quantity of the heat generating block $HB_i$, as will be described later.

When the heating region $A_i$ is classified as the image heating region AI (S1036), the control temperature $TGT_i$ is set as $TGT_i = T_{AI} - K_{AI}$ (S1038). When a standard sheet is passed in the fixing apparatus 200 of the present embodiment, $T_{AI}$ is set to 198° C.

Next, a case in which the heating region $A_i$ is classified as the non-image heating region AP (S1037) will be described. When the heating region $A_i$ is classified as the non-image heating region AP, the control temperature $TGT_i$ is set as $TGT_i = T_{AP} - K_{AP}$ (S1039).

Here, $T_{AP}$ is a reference temperature of the non-image heating region AP and is set as a temperature less than the reference temperature $T_{AI}$ of the image heating region AI so that the heat generating quantity of the heat generating block $HB_i$ in the non-image heating region AP is less than that of the image heating region AI to realize power saving of the image forming apparatus 100. In the present embodiment, $T_{AP}$ is set as 158° C. The reference temperature $T_{AI}$ of the image heating region AI and the reference temperature $T_{AP}$ of the non-image heating region AP are preferably variable according to the type of the recording material P, such as a thick paper or a thin paper. Moreover, the reference temperature may be adjusted according to image information such as an image density or a pixel density.

Moreover, the temperature correction term KAI of the image heating region AI and the temperature correction term $K_{AP}$ of the non-image heating region AP are set according to the heat accumulation count value $CT_i$ in each heating region $A_i$ as illustrated in FIG. 8A, similarly to Embodiment 1.

Next, a case in which the heating region $A_i$ is classified as the recording material edge region AE (S1033) will be described. In S1040, it is determined whether a heat accumulation count value $CT_e$ of the recording material edge region AE satisfies Expression 1 below:

$$CT_e < CT_m - W_e \qquad \text{(Expression 1)}.$$

$CT_m$ is a heat accumulation count value of each heating region $A_i$ in the recording material central region AM, and $W_e$ is a determination value for determining occurrence of a conveying defect at the recording material edge.

Next, S1040 will be described in detail.

In S1040, it is determined whether the image heating apparatus 200 is in a state in which paper wrinkle as a recording material conveying defect occurs. As described above, the heat accumulation count value CT is a parameter correlated with the heat accumulation amount of the fixing apparatus 200 in each heating region $A_i$, and the greater the heat accumulation count value CT, the greater heat accumulation amount. Therefore, the greater the heat accumulation count value CT, the greater the heat accumulation amount of the pressure roller 208 as a fixing member of the image heating apparatus 200. Therefore, the greater the heat accumulation count value CT, the more the outer diameter of the pressure roller 208 is expanded, and the greater the recording material conveying force. As described above, the heat accumulation count value CT is a parameter correlated with the recording material conveying force.

When the heat accumulation count value $CT_e$ becomes less than the heat accumulation count value $CT_m$ by the determination value $W_e$ or more, as illustrated in Expression 1 in S1040 of the control flow, a paper wrinkle of the recording material P may occur due to the above-described change. In the present embodiment, the determination value $W_e$ is set to 150. The determination value $W_e$ is preferably variable according to the type (paper weight) of the recording material P, such as a thick paper or a thin paper. Moreover, the determination value $W_e$ may be adjusted according to a use environment (temperature or humidity).

First, when the determination criterion of S1040 is not satisfied, it is determined that the difference in the heat accumulation amount of the pressure roller 208 is within a predetermined range and a paper wrinkle of the recording material P resulting from a change in the outer diameter of the pressure roller does not occur, and the flow proceeds to S1035. Moreover, the heating region $A_i$ is classified into the image heating region AI and the non-image heating region AP similarly to the recording material central region AM (S1036 and S1037), and the control temperature is determined according to the classification (S1038 and S1039).

When the determination criterion of S1040 is satisfied, it is determined that a paper wrinkle of the recording material P resulting from a change in the outer diameter of the pressure roller may occur if the difference in the heat accumulation amount of the pressure roller 208 increases further, and the control temperature of the heat generating block is controlled to the control temperature $TGT_e$ for paper wrinkle correction. First, it is determined whether the heating region $A_i$ is an image range on the basis of the image data (image information) (S1041). When the heating region $A_i$ is the image range, the heating region $A_i$ is classified as the image heating region AI (S1042). When the heating region $A_i$ is not the image range, the heating region $A_i$ is classified as the non-image heating region AP (S1043). The classification of the heating region $A_i$ is used for controlling the heat generating quantity of the heat generating block $HB_i$, as will be described later.

When the heating region $A_i$ is classified as the image heating region AI (S1042), the control temperature is set as $TGT_e = T_{AI} - K_{AI} + W_{AI}$ (S1044).

Here, $T_{AI}$ is a reference temperature of the image heating region AI and is set as a temperature appropriate for fixing a non-fixed image to the recording material P. When a standard sheet is passed in the fixing apparatus 200 of the present embodiment, $T_{AI}$ is set to 198° C.

Moreover, $K_{AI}$ is a temperature correction term of the image heating region AI and is set according to a heat accumulation count value $CT_i$ in each heating region $A_i$ as illustrated in FIG. 8A.

Moreover, $W_{AI}$ is a paper wrinkle correction term of the image heating region AI and is set as illustrated in FIG. 13B.

Next, a case in which the heating region $A_i$ is classified as the non-image heating region AP (S1043) will be described. When the heating region $A_i$ is classified as the non-image heating region AP, the control temperature is set as $TGT_e = T_{AP} - K_{AP} + W_{AP}$ (S1045). Here, $T_{AP}$ is a reference temperature of the non-image heating region AP and is set as a temperature appropriate for fixing a non-fixed image to the recording material P. When a standard sheet is passed in the fixing apparatus 200 of the present embodiment, $T_{AP}$ is set to 158° C.

Moreover, $K_{AP}$ is a temperature correction term of the non-image heating region AP and is set according to the heat accumulation count value $CT_i$ in each heating region $A_i$, as illustrated in FIG. 8B.

Moreover, $W_{AP}$ is a paper wrinkle correction term of the non-image heating region AP and is set as illustrated in FIG. 13C.

For example, in a state in which the heat accumulation count value $CT_i$ is 100 or less, the control temperature of the non-image heating region AP is set as $TGT_e = 193°$ C.

By the above-described control flow, even when such an image as the image pattern illustrated in FIGS. 10A to 10C does not pass through the edge region, heating is performed in a level equivalent to the image heating region AI of the recording material central region AM. By doing so, it is possible to suppress an increase in the difference between the edge heat accumulation count value $CT_e$ and the central portion heat accumulation count value $CT_m$. Moreover, in the present embodiment, even when an image passes through the edge region, it is possible to suppress an increase in the difference between the edge heat accumulation count value $CT_e$ and the central portion heat accumulation count value $CT_m$. Therefore, it is possible to maintain a paper wrinkle suppression effect and to prevent the occurrence of a paper wrinkle of a recording material P.

The setting values of the reference temperature ($T_{AI}$ and $T_{AP}$) of each heating region $A_i$, the temperature correction term ($K_{AI}$ and $K_{AP}$) of each heating region $A_i$, the paper wrinkle correction term ($W_{AI}$ and $W_{AP}$), and the determination value $W_e$ for a conveying defect at the edges of the recording material P are determined appropriately by taking the configuration of the image forming apparatus 100 and the fixing apparatus 200 and the printing conditions into consideration. These values are not limited, however, to the above-described values.

Next, the advantages of Embodiment 2 will be described by way of a heater control method using a comparative example and a specific example of Embodiment 2 to be described later will be described as a specific printing example. In the specific example of Embodiment 2, in a state in which the fixing apparatus 200 is in a room-temperature state (that is, a state in which the heat accumulation count value $CT_i$ of each heating region $A_i$ is 0), 100 pages of a recording material P illustrated in FIGS. 10A to 10C were printed continuously. FIG. 14A illustrates a change in the heat accumulation count value $CT_i$ of the heating region $A_i$ with respect to the number of passing recording materials in Embodiment 2.

Moreover, FIG. 14B illustrates a control temperature corresponding to the number of passing sheets, a heat accumulation count value, and the occurrence of a paper wrinkle in the printed recording material.

In FIG. 14A, a solid line indicates a change in the heat accumulation count values $CT_2$ to $CT_6$ of the heating regions ($A_2$, $A_3$, $A_4$, $A_5$, and $A_6$) classified as the recording material central region AM and the image heating region AI in Embodiment 2. A two-dot chain line indicates a change in the heat accumulation count values $CT_1$ and $CT_7$ of the heating regions ($A_1$ and $A_7$) classified as the recording material edge region AE and the non-image heating region AP in Embodiment 2. Moreover, a broken line indicates a change in the heat accumulation count values $CT_1$ and $CT_7$ of the heating regions $A_1$ and $A_7$ in the comparative example. Since the heat accumulation count values of the heating regions $A_2$, $A_3$, $A_4$, $A_5$, and $A_6$ in the comparative example show the same change as Embodiment 2, the description thereof will be omitted.

In the heating regions ($A_2$, $A_3$, $A_4$, $A_5$, and $A_6$) classified as the recording material central region AM in Embodiment 2, the heat accumulation count values $CT_2$ to $CT_6$ increase as the number of printed pages increases. Since the heating regions ($A_2$, $A_3$, $A_4$, $A_5$, and $A_6$) are classified as the image heating region AI, the temperature $T_{AI}$ of the image heating region AI is set to 198° C., and the heat accumulation count values $CT_2$ to $CT_6$ of the 39th page reach 185.

Moreover, since the heating regions ($A_1$ and $A_7$) classified as the recording material edge region AE is classified as the non-image heating region AP, the temperature $T_{AP}$ of the image heating region AI is set to 158° C. Therefore, although the heat accumulation count values $CT_1$ and $CT_7$ increase as the number of printed pages increases, since the heat generating quantity of the heat generating block $HB_i$ is decreased, the heat accumulation count values $CT_1$ and $CT_7$ do not increase to be greater than the heat accumulation count values $CT_2$ to $CT_6$ of the recording material central region AM. The heat accumulation count values $CT_1$ and $CT_7$ of the 39th page reach 33. As described above, the determination value $W_e$ is set to 150. Therefore, the condition of Expression 1 illustrated in S1040 of the control flow of FIG. 13A is satisfied when the number of passing sheets reaches 39. Therefore, the control temperature of the heating regions ($A_1$ and $A_7$) in the 39th and subsequent pages is set as $TGT_e = T_{AI} - K_A i + W_{AP}$. The control temperature $TGT_i$ is set to 193° C.

For the 39th and subsequent pages, the heat accumulation count values $CT_1$ and $CT_7$ increase as illustrated in FIG. 14A, and the difference in the heat accumulation count value of the recording material edge region AE and the recording material central region AM is maintained to approximately 150 without increasing to a certain level or higher as illustrated in FIG. 14B. As described above, although the pressure roller 208 of the present embodiment is configured such that the outer diameter at the ends is greater by approximately 100 μm than the outer diameter at the central portion, a paper wrinkle can be suppressed when the outer diameter difference is maintained to 70 μm or more. Although the heat accumulation count value is a parameter correlated with the outer diameter of the pressure roller 208, the heat accumulation count value difference of 150 corresponds to a pressure roller outer diameter difference of 30 μm. Therefore, in such a printing example as the specific example of Embodiment 2, although the pressure roller outer diameter difference decreases, the outer diameter difference can be maintained to 70 μm or more. Therefore, in Embodiment 2, the pressure roller outer diameter difference in the recording material edge region AE and the recording material central region AM can be maintained within a certain range and the occurrence of a paper wrinkle can be suppressed.

In the comparative example, as illustrated in FIGS. 14A and 14C, a difference in the heat accumulation amount of the recording material edge region AE and the recording material central region AM increases as the number of passing sheets increases and reaches 231 when the number of passing sheets reaches 70. Therefore, in the comparative example, the outer diameter difference at the central portion and the end of the pressure roller decreases up to 60 μm or less when the number of passing sheets reaches 70. Therefore, the pressure roller outer diameter in the recording material central region AM becomes greater than the outer diameter in the recording material edge region AE and a paper wrinkle suppression effect decreases. As a result, a paper wrinkle occurs.

As described above, in the present embodiment, the difference in the heat accumulation amount of the recording material edge region AE and the recording material central region AM does not increase up to a certain level or more. Therefore, it is possible to maintain the outer diameter difference of the pressure roller 208 to be within a certain range and to suppress the occurrence of a paper wrinkle. Moreover, regardless of the presence of an image in the recording material edge region AE, it is possible to suppress a difference in the heat accumulation amount and to suppress a paper wrinkle more stably. Moreover, by changing the control temperature $TGT_i$ between the image heating region AI and the non-image heating region AP, it is possible to decrease the heat generating quantity of the non-image heating region AP and to achieve power saving.

Embodiment 3

Embodiment 3 of the present invention will be described. In Embodiment 3, the heat accumulation count values CT indicating the thermal history between the recording material edge region AE and the recording material central region AM are compared, and the control temperature of the image heating region AI and the control temperature of the non-image heating region AP in the recording material edge region AE are changed according to the comparison result using a paper conveying defect correction term. A basic configuration and operations of the image forming apparatus 100 and the image heating apparatus 200 of Embodiment 3 are the same as those of Embodiment 1. Therefore, elements of Embodiment 3 having the same or corresponding function and configuration as those of Embodiment 1 are denoted by the same reference numerals and the description thereof will be omitted. Matters that are not particularly described in Embodiment 3 are similar to those of Embodiment 1.

Figure 15A:
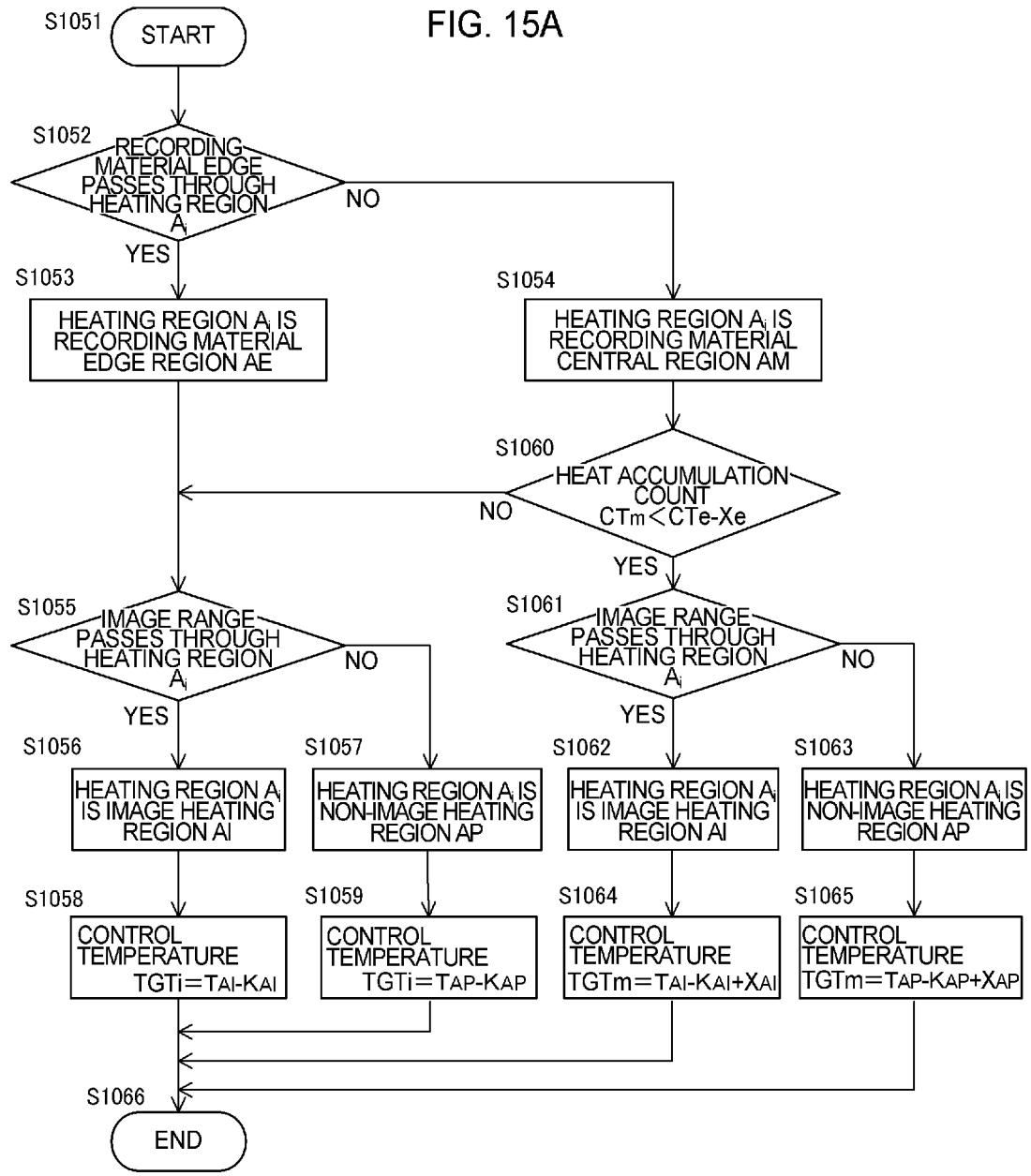
FIG. 15A is a flowchart for determining a classification and a control temperature of a heating region according to Embodiment 3.

FIG. 15A is a flowchart for determining a classification and a control temperature of a heating region $A_i$ according to Embodiment 3. FIGS. 15B and 15C illustrate setting values of parameters associated with the control temperature according to Embodiment 3. As illustrated in the flowchart of FIG. 15A, each of the heating regions $A_i$ (i=1 to 7) is classified into a recording material edge region AE, a recording material central region AM, an image heating region AI, and a non-image heating region AP. The heating region $A_i$ is classified on the basis of image data (image information) and recording material information (a recording material size) sent from an external apparatus (not illustrated), such as a host computer.

That is, on the basis of the size information of a recording material P, it is determined whether the heating region $A_i$ is a region through which the recording material edge PE passes or a region through which a region other than the recording material edge passes (S1052). When the recording material edge PE passes through the heating region $A_i$, the heating region $A_i$ is classified as the recording material edge region AE (S1053). When the recording material central portion other than the recording material edge PE passes through the heating region $A_i$, the heating region $A_i$ is classified as the recording material central region AM (S1054). Subsequently, it is determined whether the heating region $A_i$ classified as the recording material edge region AE is an image range on the basis of the image data (image information) (S1055). When the heating region $A_i$ is the image range, the heating region $A_i$ is classified as the image heating region AI (S1056). When the heating region $A_i$ is not the image range, the heating region $A_i$ is classified as the non-image heating region AP (S1057). The classification of the heating region $A_i$ is used for controlling the heat generating quantity of the heat generating block $HB_i$ as will be described later.

When the heating region $A_i$ is classified as the image heating region AI (S1056), the control temperature $TGT_i$ is set as $TGT_i=T_{AI}-K_{AI}$ (S1058). When a standard sheet is passed in the fixing apparatus 200 of the present embodiment, $T_{AI}$ is set to 198° C.

Next, a case in which the heating region $A_i$ is classified as the non-image heating region AP (S1057) will be described. When the heating region $A_i$ is classified as the non-image heating region AP, the control temperature $TGT_i$ is set as $TGT_i=T_{AP}-K_{AP}$ (S1059).

Here, $T_{AP}$ is a reference temperature of the non-image heating region AP, and is set as a temperature less than the reference temperature $T_{AI}$ of the image heating region AI, so that the heat generating quantity of the heat generating block $HB_i$ in the non-image heating region AP is less than that of the image heating region AI to realize power saving of the image forming apparatus 100. In the present embodiment, $T_{AP}$ is set as 158° C. The reference temperature $T_{AI}$ of the image heating region AI and the reference temperature $T_{AP}$ of the non-image heating region AP are preferably variable according to the type of the recording material P, such as a thick paper or a thin paper. Moreover, the reference temperature may be adjusted according to image information such as an image density or a pixel density.

Moreover, the temperature correction term $K_{AI}$ of the image heating region AI and the temperature correction term $K_{AP}$ of the non-image heating region AP are set according to the heat accumulation count value $CT_i$ in each heating region $A_i$ as illustrated in FIG. 8A similarly to Embodiment 1.

Next, a case in which the heating region $A_i$ is classified as the recording material central region AM (S1054) will be described. In S1060, it is determined whether a heat accumulation count value $CT_m$ of the recording material central region AM satisfies Expression 4 below:

$$CT_m < CT_e - X_e \quad \text{(Expression 4)}.$$

$CT_e$ is a heat accumulation count value of each heating region $A_i$ in the recording material edge region AE, and $X_e$ is a determination value for determining a recording material conveying defect.

Next, S1060 will be described in detail.

In S1060, it is determined whether the image heating apparatus 200 is in a state in which a recording material trailing edge pop-up as a recording material conveying defect occurs. A recording material trailing edge pop-up is a phenomenon in which a trailing edge of a recording material in the conveying direction pops up toward an image surface on an upstream side of the image heating apparatus 200, and is a phenomenon in which the trailing edge makes contact with a constituent member of the image forming apparatus 100 to cause an image defect. As described above, the heat accumulation count value CT is a parameter correlated with the heat accumulation amount of the fixing apparatus 200 in each heating region $A_i$, and the greater the heat accumulation count value, the greater the heat accumulation amount. Therefore, the greater the heat accumulation count value CT, the greater the heat accumulation amount of the pressure roller 208 that is a fixing member of the image heating apparatus 200. Therefore, the greater the heat accumulation count value CT, the more the outer diameter of the pressure roller is expanded, and the greater the recording material conveying force. As described above, the heat accumulation count value CT is a parameter correlated with the recording material conveying force.

When the heat accumulation count value $CT_m$ given by Expression 4 in S1060 of the control flow becomes less than the heat accumulation count value $CT_e$ by the determination value $X_e$ or more, an image defect resulting from a trailing edge pop-up may occur due to the above-described change. In the present embodiment, the determination value $X_e$ is set to 150. The determination value $X_e$ is preferably variable according to the type (paper weight) of the recording material P, such as a thick paper or a thin paper. Moreover, the determination value $X_e$ may be adjusted according to a use environment (temperature or humidity).

First, when the determination criterion of S1060 is not satisfied, it is determined that the difference in the heat accumulation amount of the pressure roller 208 is within a predetermined range, and a trailing edge pop-up of the recording material resulting from a change in the outer diameter of the pressure roller does not occur, and the flow proceeds to S1055. Moreover, the heating region $A_i$ is classified into the image heating region AI and the non-image heating region AP similarly to the recording material edge region AE (S1056 and S1057), and the control temperature is determined according to the classification (S1058 and S1059).

When the determination criterion of S1060 is satisfied, it is determined that a trailing edge pop-up of the recording material resulting from a change in the outer diameter of the pressure roller may occur if the difference in the heat accumulation amount of the pressure roller 208 increases further, and the control temperature of the heat generating block is controlled to the control temperature $TGT_m$ for paper conveyance correction. First, it is determined whether the heating region $A_i$ is an image range on the basis of the image data (image information) (S1061). When the heating region $A_i$ is the image range, the heating region $A_i$ is classified as the image heating region AI (S1062). When the heating region $A_i$ is not the image range, the heating region $A_i$ is classified as the non-image heating region AP (S1063). The classification of the heating region $A_i$ is used for controlling the heat generating quantity of the heat generating block $HB_i$ as will be described later.

When the heating region $A_i$ is classified as the image heating region AI (S1062), the control temperature is set as $TGT_e=T_{AI}-K_Ai+X_{AI}$ (S1064).

Here, $T_{AI}$ is a reference temperature of the image heating region AI, and is set as a temperature appropriate for fixing a non-fixed image to the recording material P. When a standard sheet is passed in the fixing apparatus 200 of the present embodiment, $T_{AI}$ is set to 198° C.

Moreover, $K_{AI}$ is a temperature correction term of the image heating region AI, and is set according to a heat accumulation count value $CT_i$ in each heating region $A_i$ as illustrated in FIG. 8A.

Moreover, $X_{AI}$ is a paper conveyance correction term of the image heating region AI, and is set as illustrated in FIG. 15B.

Next, a case in which the heating region $A_i$ is classified as the non-image heating region AP (S1063) will be described. When the heating region $A_i$ is classified as the non-image heating region AP, the control temperature is set as $TGT_m=T_{AP}-K_{AP}+X_{AP}$ (S1065). Here, $T_{AP}$ is a reference temperature of the non-image heating region AP, and is set as a temperature appropriate for fixing a non-fixed image to the recording material P. When a standard sheet is passed in the fixing apparatus 200 of the present embodiment, $T_{AP}$ is set to 158° C.

Moreover, $K_{AP}$ is a temperature correction term of the non-image heating region AP, and is set according to the heat accumulation count value $CT_i$ in each heating region $A_i$ as illustrated in FIG. 8B.

Moreover, $X_{AP}$ is a paper wrinkle correction term of the non-image heating region AP, and is set as illustrated in FIG. 15C.

For example, in a state in which the heat accumulation count value $CT_i$ is 100 or less, the control temperature of the non-image heating region AP is set as TGT=193° C.

Figures 16A, 16B:
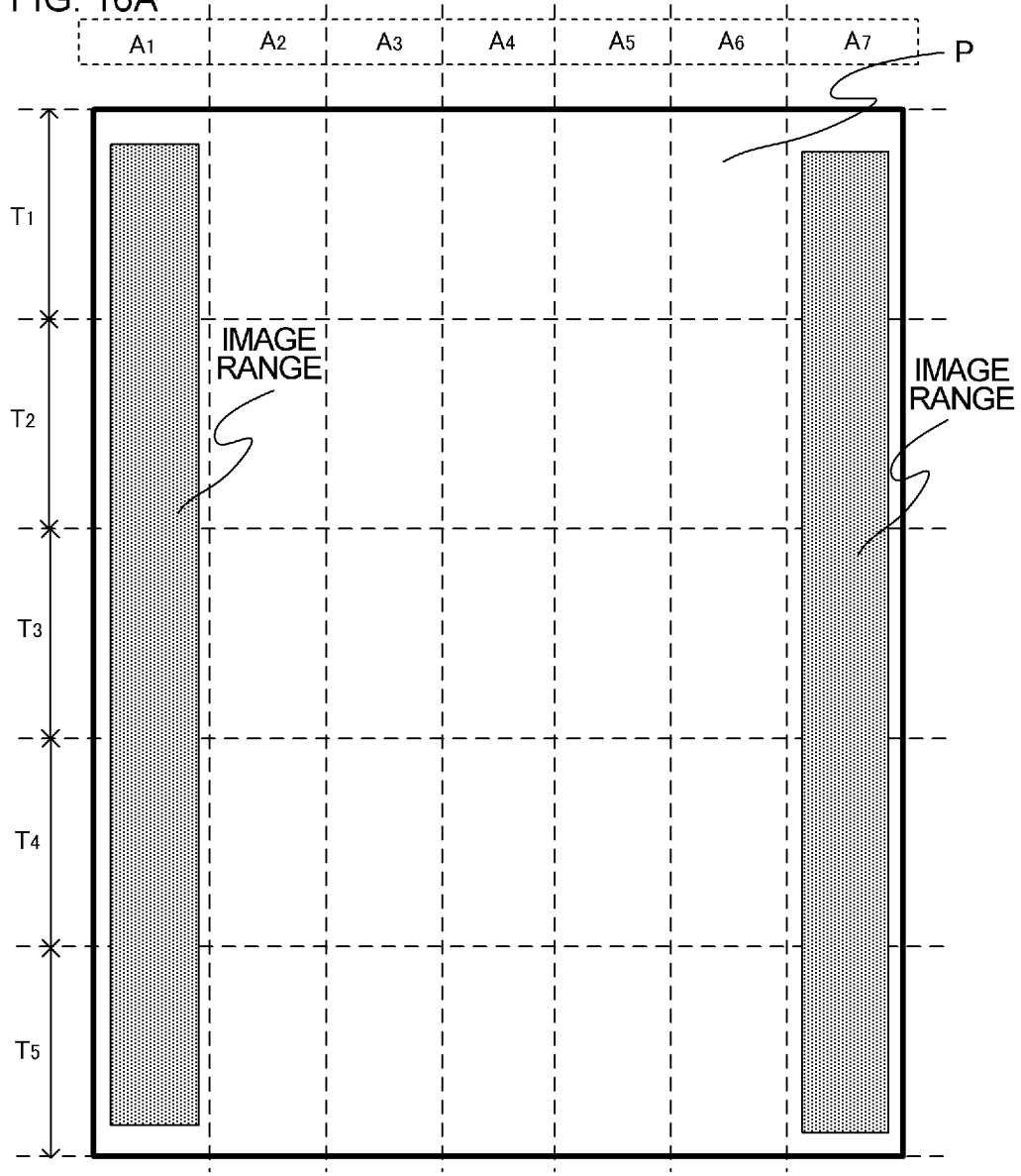
FIGS. 16A and 16B are diagrams for describing specific exemplary recording materials according to Embodiment 3.

By the above-described control flow, even when such an image as the image pattern illustrated in FIGS. 16A and 16B does not pass through the central region, heating is performed in a level equivalent to the image heating region AI of the recording material edge region AE. By doing so, it is possible to suppress an increase in the difference between the edge heat accumulation count value $CT_e$ and the central portion heat accumulation count value $CT_m$. Moreover, even when an image passes through the central region, it is possible to suppress an increase in the difference between the edge heat accumulation count value $CT_e$ and the central portion heat accumulation count value $CT_m$ and to maintain the difference to be within a predetermined range. In this way, it is possible to prevent the occurrence of a trailing edge pop-up of a recording material.

The setting values of the reference temperature ($T_{AI}$ and $T_{AP}$) of each heating region $A_i$, the temperature correction term ($K_{AI}$ and $K_{AP}$) of each heating region $A_i$, the conveying defect correction term ($X_{AI}$ and $X_{AP}$), and the determination value $X_e$ for a conveying defect of the recording material are determined appropriately by taking the configuration of the image forming apparatus 100 and the fixing apparatus 200 and the printing conditions into consideration. These values are not limited, however, to the above-described values.

Next, the advantages of Embodiment 3 will be described by way of a heater control method using a comparative example, and a specific example of Embodiment 3 to be described later will be described as a specific printing example. In the specific example of Embodiment 3, in a state in which the fixing apparatus 200 is in a room-temperature state (that is, a state in which the heat accumulation count value $CT_i$ of each heating region $A_i$ is 0), 100 pages of a recording material P illustrated in FIGS. 16A and 16B were printed continuously. FIG. 17A illustrates a change in the heat accumulation count value $CT_i$ of the heating region $A_i$ with respect to the number of passing recording materials in Embodiment 3.

Moreover, FIG. 17B illustrates a control temperature corresponding to the number of passing sheets, a heat accumulation count value, and the occurrence of an image defect resulting from a trailing edge pop-up in the printed recording material P.

In FIG. 17A, a solid line indicates a change in the heat accumulation count values $CT_1$ and $CT_7$ of the heating regions ($A_1$ and $A_7$) classified as the recording material edge region AE and the image heating region AI in Embodiment 3. A two-dot chain line indicates a change in the heat accumulation count values $CT_2$ to $CT_6$ of the heating regions ($A_2$, $A_3$, $A_4$, $A_5$, and $A_6$) classified as the recording material central region AM and the non-image heating region AP in Embodiment 3. Moreover, a broken line indicates a change in the heat accumulation count values $CT_2$ to $CT_6$ of the heating regions ($A_2$, $A_3$, $A_4$, $A_5$, and $A_6$) in the comparative example. Since the heat accumulation count values of the heating regions $A_1$, and $A_7$ in the comparative example show the same change as Embodiment 3, the description thereof will be omitted.

In the heating regions ($A_1$ and $A_7$) classified as the recording material edge region AE in Embodiment 3, the heat accumulation count values $CT_1$ and $CT_7$ increase as the number of printed pages increases. Since the heating regions ($A_1$ and $A_7$) are classified as the image heating region AI, the temperature $T_{AI}$ of the image heating region is set to 198° C., and the heat accumulation count values $CT_1$ and $CT_7$ of the 39th page reach 185.

Moreover, since the heating regions ($A_2$, $A_3$, $A_4$, $A_5$, and $A_6$) classified as the recording material central region AM are classified as the non-image heating region AP, the temperature $T_{AP}$ of the image heating region AI is set to 158° C. Therefore, although the heat accumulation count values $CT_2$ to $CT_6$ increase as the number of printed pages increases, since the heat generating quantity of the heat generating block $HB_i$ is decreased, the heat accumulation count values $CT_2$ to $CT_6$ do not increase to be greater than the heat accumulation count values $CT_1$ and $CT_7$ of the recording material edge region AE. The heat accumulation count values $CT_2$ to $CT_6$ of the 39th page reach 33. As described above, the determination value $X_e$ is set to 150. Therefore, the condition of Expression 4 illustrated in S1060 of the control flow of FIG. 15A is satisfied when the number of passing sheets reaches 39. Therefore, the control temperature of the heating regions ($A_2$ to $A_6$) in the 39th and subsequent pages is set as $TGT_m = T_{AP} - K_{AP} + X_{AP}$. The control temperature $TGT_m$ is set to 203° C.

For the 39th and subsequent pages, the heat accumulation count values $CT_2$ to $CT_6$ increase as illustrated in FIG. 17A, and the difference in the heat accumulation count value of the recording material edge region AE and the recording material central region AM is maintained to approximately 150 without increasing to a certain level or higher, as illustrated in FIG. 17B. As described above, although the pressure roller 208 of the present embodiment is configured such that the outer diameter at the ends is greater by approximately 100 μm than the outer diameter at the central portion, a trailing edge pop-up can be suppressed when the outer diameter difference is maintained to 130 μm or smaller. Although the heat accumulation count value $CT_i$ is a parameter correlated with the outer diameter of the pressure roller, the heat accumulation count value difference of 150 corresponds to a pressure roller outer diameter difference of 30 μm. Therefore, in such a printing example as the specific example of Embodiment 3, although the pressure roller outer diameter difference decreases, the outer diameter difference can be maintained to 130 μm or smaller. Therefore, in Embodiment 3, the pressure roller outer diameter difference in the recording material edge region AE and the recording material central region AM can be maintained within a certain range, and the occurrence of a trailing edge pop-up can be suppressed.

In the comparative example, as illustrated in FIGS. 17A and 17C, a difference in the heat accumulation amount of the recording material edge region AE and the recording material central region AM increases as the number of passing sheets increases, and reaches 231 when the number of passing sheets reaches 70. Therefore, in the comparative example, the outer diameter difference at the central portion and the end of the pressure roller decreases up to 140 μm or more when the number of passing sheets reaches 70. Therefore, the pressure roller outer diameter in the recording material edge region AE becomes greater than the outer diameter in the recording material central region AM. Since a difference in the recording material conveying force increases when the outer diameter difference between the central portion and the end of the pressure roller increases, the recording material P receives a large force that spreads the recording material P in the direction of the edges PE in the width direction (the direction orthogonal to the conveying direction of the recording material). Therefore, the recording material P pops up toward the image surface after the trailing edge slips out of the transfer roller 20.

As described above, in the present embodiment, the difference in the heat accumulation amount of the recording material edge region AE and the recording material central region AM does not increase up to a certain level or more. Therefore, it is possible to maintain the outer diameter difference of the pressure roller to be within a certain range and to suppress the occurrence of a trailing edge pop-up. Moreover, regardless of the presence of an image in the recording material edge region AE, it is possible to suppress a difference in the heat accumulation amount and to suppress a trailing edge pop-up more stably. Moreover, by changing the control temperature $TGT_i$ between the image heating region AI and the non-image heating region AP, it is possible to decrease the heat generating quantity of the non-image heating region AP and to achieve power saving.

Embodiment 4

Embodiment 4 of the present invention will be described. In Embodiment 4, the heat accumulation count values CT indicating the thermal history between the heating regions $A_i$ at symmetric positions in relation to the central position of the image heating apparatus 200 in the direction orthogonal to the conveying direction of the recording material are compared, and the control temperature of the image heating region AI and the control temperature of the non-image heating region AP are changed according to the comparison result. A basic configuration and operations of the image forming apparatus 100 and the image heating apparatus 200 of Embodiment 4 are the same as those of Embodiment 1. Therefore, elements of Embodiment 4 having the same or corresponding function and configuration as those of Embodiment 1 are denoted by the same reference numerals and the description thereof will be omitted. Matters that are not particularly described in Embodiment 4 are similar to those of Embodiment 1.

Figure 18:
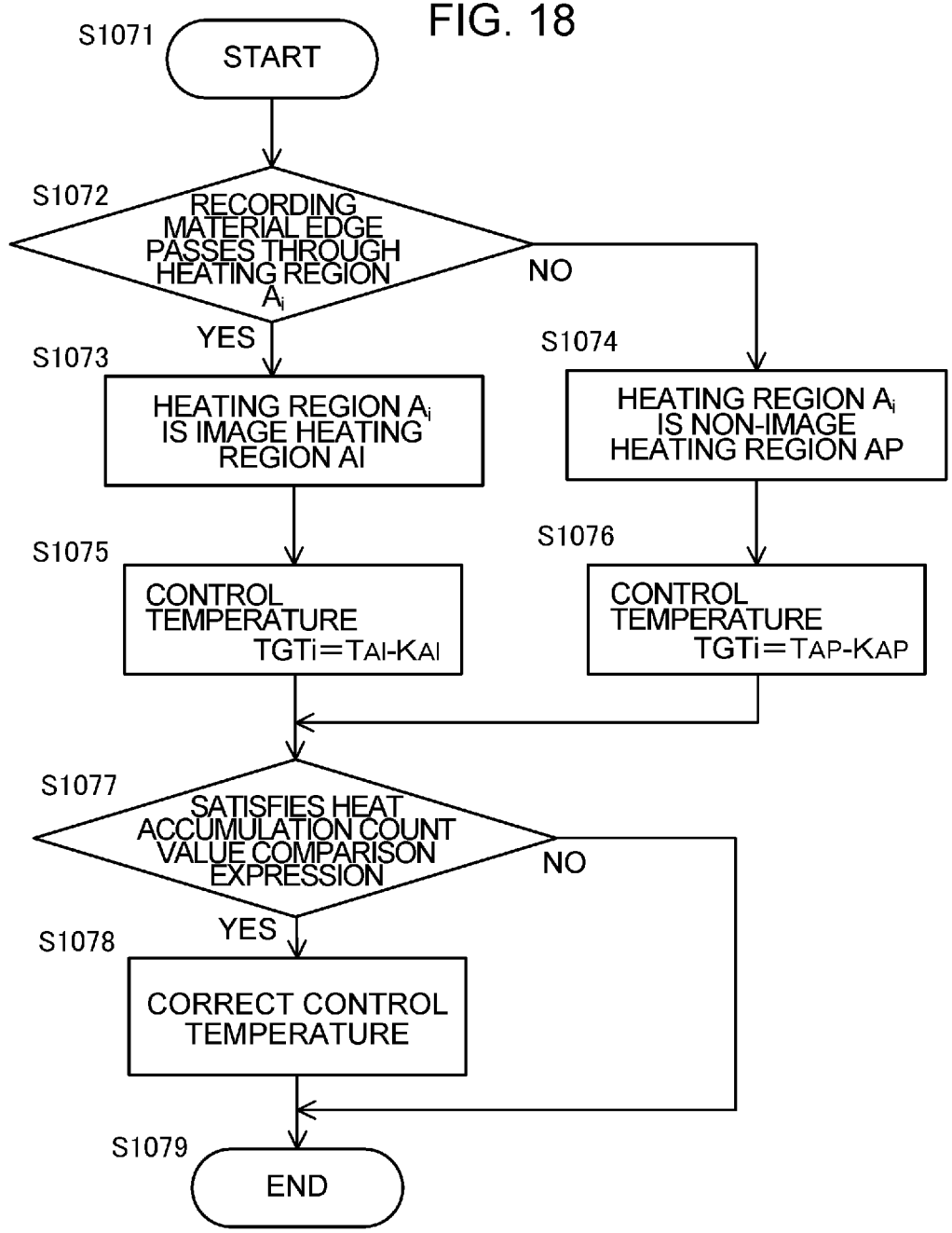
FIG. 18 is a flowchart for determining a classification and a control temperature of a heating region according to Embodiment 4.

FIG. 18 is a flowchart for determining a classification and a control temperature of a heating region $A_i$ according to Embodiment 4. The heating region $A_i$ is classified on the basis of image data (image information) sent from an external apparatus (not illustrated), such as a host computer. That is, it is determined whether the heating region $A_i$ is an image range on the basis of the image information (S1072). When the heating region $A_i$ is the image range, the heating region $A_i$ is classified as the image heating region AI (S1073). When the heating region $A_i$ is not the image range, the heating region $A_i$ is classified as the non-image heating region AP (S1074). The classification of the heating region $A_i$ is used for controlling the heat generating quantity of the heat generating block $HB_i$, as will be described later.

Next, a heater control method according to the present embodiment (that is, a method of controlling the heat generating quantity of the heat generating block $HB_i$ (i=1 to 7)) will be described. When the heating region $A_i$ is classified as the image heating region AI (S1073), the control temperature $TGT_i$ is set as $TGT_i=T_{AI}-K_{AI}$ (S1075). When a standard sheet is passed in the fixing apparatus 200 of the present embodiment, $T_{AI}$ is set to 198° C. Next, a case in which the heating region $A_i$ is classified as the non-image heating region AP (S1074) will be described. When the heating region $A_i$ is classified as the non-image heating region AP, the control temperature $TGT_i$ is set as $TGT_i=T_{AP}-K_{AP}$ (S1076).

Here, $T_{AP}$ is a reference temperature of the non-image heating region AP, and is set as a temperature that is less than the reference temperature $T_{AI}$ of the image heating region so that the heat generating quantity of the heat generating block $HB_i$ in the non-image heating region AP is less than that of the image heating region AI to realize power saving of the image forming apparatus 100. In the present embodiment, $T_{AP}$ is set as 158° C. The reference temperature $T_{AI}$ of the image heating region AI and the reference temperature $T_{AP}$ of the non-image heating region AP are preferably variable according to the type of the recording material P, such as a thick paper or a thin paper. Moreover, the reference temperature may be adjusted according to image information such as an image density or a pixel density.

Moreover, the temperature correction term $K_{AI}$ of the image heating region AI and the temperature correction term $K_A$ of the non-image heating region AP are set according to the heat accumulation count value $CT_i$ in each heating region $A_i$, as illustrated in FIG. 8A, similarly to Embodiment 1.

Next, comparison of heat accumulation count values in the heating region $A_i$ (S1077) will be described. In S1077, it is determined whether the heat accumulation count value $CT_i$ in each heating region $A_i$ satisfies a heat accumulation count value comparison expression illustrated in Table 1 below. In the present embodiment, the heat accumulation count values CT indicating the thermal history between heating regions $A_1$ and $A_7$, between heating regions $A_2$ and $A_6$, and between heating regions $A_3$ and $A_5$ that are at symmetric positions in relation to the central position of the image heating apparatus 200 are compared. That is, the heat accumulation count values CT in the heating regions $A_i$ formed by the pair of heat generating elements disposed symmetrically in the longitudinal direction about the heat generating element disposed at the center in the longitudinal direction among the plurality of heat generating elements are compared with each other. Expression 1-7 is a heat accumulation count value comparison expression for comparing heating regions $A_1$ and $A_7$, and Expression 2-6 is a heat accumulation count value comparison expression for comparing heating regions $A_2$ and $A_6$. Table 1 includes six heat accumulation count value comparison expressions for comparing heating regions.

In the present embodiment, $S_1$, $S_2$, and $S_3$ are determination values for determining skew of the fixing film 202, and are set to 200.

TABLE 1

| Heat accumulation count value comparison expression | | Control temperature correction | |
|---|---|---|---|
| | | Image heating region | Non-image heating region |
| $CT_1 < CT_7-S_1$ | Expression 1-7 | $TGT_1 = T_{AI} - K_{AI} + S_{AI}$ | $TGT_1 = T_{AP} - K_{AP} + S_{AP}$ |
| $CT_2 < CT_6-S_2$ | Expression 2-6 | $TGT_2 = T_{AI} - K_{AI} + S_{AI}$ | $TGT_2 = T_{AP} - K_{AP} + S_{AP}$ |

TABLE 1-continued

| Heat accumulation count value comparison | | Control temperature correction | |
|---|---|---|---|
| expression | | Image heating region | Non-image heating region |
| $CT_3 < CT_5\text{-}S_3$ | Expression 3-5 | $TGT_3 = T_{AI} - K_{AI} + S_{AI}$ | $TGT_3 = T_{AP} - K_{AP} + S_{AP}$ |
| $CT_5 < CT_3\text{-}S_3$ | Expression 5-3 | $TGT_5 = T_{AI} - K_{AI} + S_{AI}$ | $TGT_5 = T_{AP} - K_{AP} + S_{AP}$ |
| $CT_6 < CT_2\text{-}S_2$ | Expression 6-2 | $TGT_6 = T_{AI} - K_{AI} + S_{AI}$ | $TGT_6 = T_{AP} - K_{AP} + S_{AP}$ |
| $CT_7 < CT_1\text{-}S_1$ | Expression 7-1 | $TGT_7 = T_{AI} - K_{AI} + S_{AI}$ | $TGT_7 = T_{AP} - K_{AP} + S_{AP}$ |

Comparison of heat accumulation count values will be described in detail using Expression 1-7 as a representative example:

$$CT_1 < CT_7\text{-}S_1 \qquad \text{(Expression 1-7)}$$

$CT_1$ is the heat accumulation count value in the heating region $A_1$, $CT_7$ is the heat accumulation count value in the heating region $A_7$, and $S_1$ is a skew determination value of the fixing film 202 in the heating region $A_1$. The skew determination value $S_1$ of the fixing film 202 is set to 200.

In S1077, it is determined whether the fixing film 202 receives a predetermined level of a pulling force or greater in the longitudinal direction of the image heating apparatus 200. As described above, the heat accumulation count value CT is a parameter correlated with the heat accumulation amount of the fixing apparatus 200 in each heating region $A_i$, and the greater the heat accumulation count value, the greater the heat accumulation amount. Therefore, the greater the heat accumulation count value CT, the greater the heat accumulation amount of the pressure roller 208, and the greater the outer diameter of the pressure roller. As described above, the heat accumulation count value CT is a parameter correlated with the outer diameter of the pressure roller. Therefore, when the heat accumulation count value $CT_1$ becomes less than the heat accumulation count value $CT_7$, the outer diameter of the pressure roller in the heating region $A_7$ becomes greater than the outer diameter of the pressure roller in the heating region $A_1$, and a pulling force of pulling the fixing film 202 from the heating region $A_1$ toward the heating region $A_7$ is generated. Therefore, when the force of pulling the fixing film 202 from the heating region $A_1$ toward the heating region $A_7$ increases, a pressing force applied to a flange member that holds a fixing film end (not illustrated) increases, and wearing of the fixing film end is accelerated. The same is true to comparison of heat accumulation count values in the other heating regions.

Figures 19A, 19B:
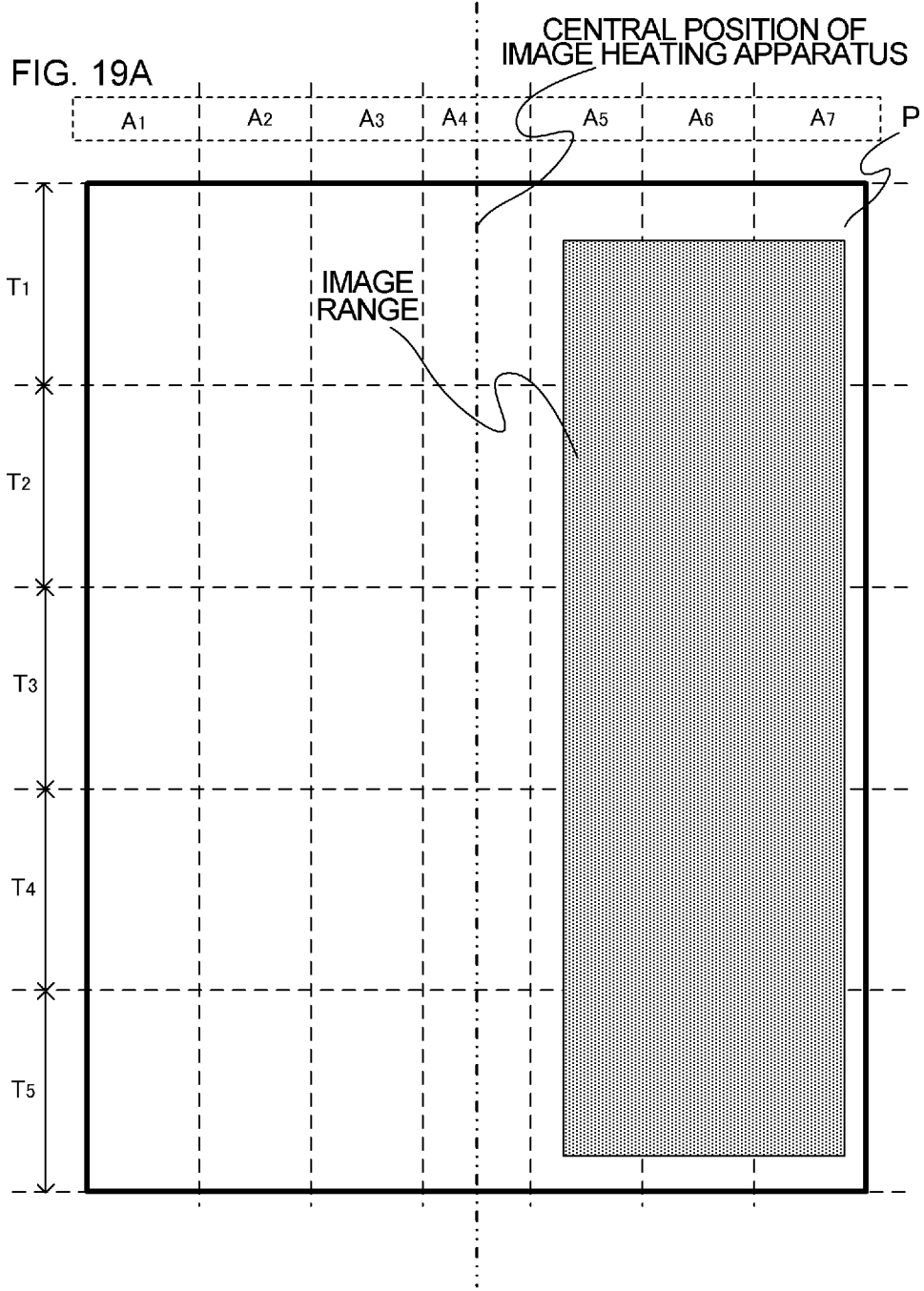
FIGS. 19A and 19B are diagrams for describing a specific example of Embodiment 4.

When the heat accumulation count value comparison expression is satisfied in S1077, the control temperature is corrected (S1078). As for control temperature correction, as illustrated in Table 1, the control temperature $TGT_i$ in the image heating region AI is set as $TGT_i=T_{AI}-K_{AI}+S_{AI}$. The control temperature $TGT_i$ in the non-image heating region AP is set as $TGT_i=T_{AP}-K_{AP}+S_{AP}$. $T_{AI}$ is the reference temperature of the image heating region AI, $K_{AI}$ is the temperature correction term of the image heating region AI, $S_{AI}$ is the skew correction term of the image heating region AI, and $S_{AP}$ is the skew correction term of the non-image heating region AP. In the present embodiment, the skew correction term $S_{AI}$ of the image heating region AI is set to 1° C., and the skew correction term SAP of the non-image heating region AP is set to 35° C. By the above-described setting, even when the image pattern illustrated in FIGS. 19A and 19B is printed continuously, it is possible to suppress an increase in the difference in the heat accumulation count value between heating regions $A_i$. Therefore, it is possible to suppress application of a pulling force in the longitudinal direction of the fixing film 202 and to prevent acceleration of wearing of the fixing film end.

As described above, in the present embodiment, the control temperature $TGT_i$ of the respective heating regions $A_i$ is determined according to the classification and the heat accumulation count value $CT_i$ of the heating region $A_i$. The setting values of the reference temperature ($T_{AI}$ and $T_{AP}$) of each heating region $A_i$, the temperature correction term ($K_{AI}$ and $K_{AP}$) of each heating region $A_i$, and the skew correction term ($S_{AI}$ and SAP) of each heating region $A_i$ are determined appropriately by taking the configuration of the image forming apparatus 100 and the fixing apparatus 200 and the printing conditions into consideration. That is, these values are not limited to the above-described values.

Next, the advantages of Embodiment 4 will be described by way of a heater control method using a comparative example and a specific example of Embodiment 4 to be described later will be described as a specific printing example. In Embodiment 4, in a state in which the fixing apparatus 200 is in a room-temperature state (that is, a state in which the heat accumulation count value $CT_i$ of each heating region $A_i$ is 0), 100 pages of a recording material (LTR size: a sheet width of 216 mm, a sheet length of 279 mm, and a paper weight of 75 g/m²) illustrated in FIGS. 19A and 19B were printed continuously. It is assumed that the printed image is disposed in the entire range in which the image passes through the heating regions $A_5$, $A_6$, and $A_7$ on the recording material P. FIG. 20A illustrates a change in the heat accumulation count value $CT_i$ of the heating region $A_i$ with respect to the number of passing recording materials in Embodiment 4.

Moreover, FIG. 20B illustrates a control temperature and a heat accumulation count value corresponding to the number of passing sheets.

In the comparative example, the control temperatures $TGT_i$ of the image heating region AI and the non-image heating region AP are set similarly to those of Embodiment 4 using the control flow of FIG. 11.

In FIG. 20A, a solid line indicates a change in the heat accumulation count values $CT_5$ to $CT_7$ of the heating regions ($A_5$ to $A_7$) classified as the image heating region AI in Embodiment 4. A two-dot chain line indicates a change in the heat accumulation count values $CT_1$ to $CT_4$ of the heating regions ($A_1$ to $A_4$) classified as the non-image heating region AP. Moreover, for comparison, a broken line indicates a change in the heat accumulation count values $CT_1$ to $CT_4$ of the heating regions ($A_1$ to $A_4$) in Comparative Example 1. Since the heat accumulation count values $CT_5$ to $CT_7$ in Comparative Example 1 show the same change as Embodiment 4, the description thereof will be omitted.

In the heating regions ($A_5$ to $A_7$) classified as the image heating region AI in Embodiment 4, the heat accumulation count values $CT_5$ to $CT_7$ increase as the number of printed pages increases. Since the heating regions ($A_5$ to $A_7$) are classified as the image heating region AI, the temperature $T_{AI}$ of the image heating region is set to 198° C., and the heat accumulation count values $CT_5$ to $CT_7$ of the 55th page reach 242. Moreover, since the heating regions ($A_1$ to $A_4$) classified as the non-image heating region AP are classified as the non-image heating region AP, the temperature $T_{AP}$ of the image heating region is set to 158° C. Therefore, although the heat accumulation count values $CT_2$ and $CT_6$ increase as the number of printed pages increases, since the heat generating quantity of the heat generating block $HB_i$ is decreased, the heat accumulation count values $CT_2$ and $CT_6$ do not increase to be greater than the heat accumulation count values $CT_5$ to $CT_7$ of the recording material central region AM. The heat accumulation count values $CT_2$ and $CT_6$ of the 25th page reach 41. Therefore, Expressions 1-7, 2-6, and 3-5 that are heat accumulation count value comparison expressions in S1077 of the control flow illustrated in FIG. 18 are satisfied when the number of passing sheets reaches 55. Therefore, the control temperature of the heating regions $A_1$, $A_2$, and $A_3$ is corrected according to Table 1 for the 55th and subsequent pages (S1078). From $TGT_1=T_{AP}-K_{AP}+S_{AP}$, the control temperature $TGT_1$ is set to 193° C. Moreover, the control temperatures $TGT_2$ and $TGT_3$ are set to 193° C. in a similar manner.

As illustrated in FIG. 20A, an increase in the heat accumulation count value $CT_1$ for the 55th and subsequent pages is substantially equal to that of the heat accumulation count value $CT_7$ corresponding to the image heating region AI. Moreover, as illustrated in FIG. 20B, a heat accumulation amount difference $CT_1-CT_7$ in heating regions $A_1$ and $A_7$ is maintained to approximately 200 and does not increase to a certain level or greater. As described above, an outer diameter difference of the pressure roller between heating regions $A_i$ at symmetric positions in relation to the central position of the image heating apparatus 200 in the direction orthogonal to the conveying direction of the recording material is set to 50 μm or smaller so that application of a pulling force in the longitudinal direction of the fixing film 202 is suppressed. In this way, it is possible to prevent acceleration of wearing of the fixing film end. Although the heat accumulation count value is a parameter correlated with the outer diameter of the pressure roller, the heat accumulation count value difference of 200 corresponds to a pressure roller outer diameter difference of 40 μm. Therefore, in the specific printing example of Embodiment 4, the outer diameter difference of the pressure roller between heating regions $A_i$ at symmetric positions can be maintained to be approximately 40 μm. Therefore, in Embodiment 4, it is possible to maintain the outer diameter difference of the pressure roller between the heating regions $A_1$ and $A_7$ to be within a certain range and to prevent acceleration of wearing of a fixing film end by suppressing application of a pulling force in the longitudinal direction of the fixing film 202. The same advantages are obtained for the other heating regions $A_i$.

In the comparative example, as illustrated in FIGS. 20A and 20C, the difference in the heat accumulation amount of the heating regions $A_1$ and $A_7$ increases as the number of passing sheets increases, such that the heat accumulation amount difference reaches 250 for the number of passing sheets of 80 and reaches 287 for the number of passing sheets of 100. Therefore, in the comparative example, the outer diameter difference between the central portion and the ends of the pressure roller is 50 μm or more when the number of passing sheets reaches 100, and the pulling force applied in the longitudinal direction of the fixing film 202 increases. Therefore, when the force of pulling the fixing film 202 from the heating region $A_1$ toward the heating region $A_7$ increases, a pressing force applied to a flange member that holds a fixing film end (not illustrated) increases, and wearing of the fixing film end is accelerated.

As described above, in the recording material edge PE, the difference in the heat accumulation amount between the heating regions $A_i$ in the longitudinal direction of the image heating apparatus 200 does not increase up to a certain level or more. Therefore, it is possible to maintain the outer diameter difference of the pressure roller to be within a certain range and to suppress wearing of the fixing film end resulting from an increase in the pulling force. Moreover, by changing the control temperature $TGT_i$ between the image heating region AI and the non-image heating region AP, it is possible to decrease the heat generating quantity of the non-image heating region AP and to achieve power saving.

The respective configurations of the above-described embodiments may be combined as much as possible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image heating apparatus comprising:
 a heater configured to generate heat to heat an image formed on a recording material, the heater having a plurality of heat generating elements divided in a direction orthogonal to a conveying direction of the recording material;
 a roller for forming a nip portion for pinching and conveying the recording material together with the heater;
 an acquisition portion that acquires a plurality of count values indicating heat accumulation amounts of a plurality of heating regions heated by the plurality of heat generating elements, respectively; and
 a control portion configured to independently control electrical power supplied to each of the plurality of heat generating elements, the control portion controlling the electrical power supplied to each of the plurality of heat generating elements so that a difference between a first count value indicating a heat accumulation amount of a first heating region heated by a first heat generating element, among the plurality of heat generating elements, and a second count value indicating a heat accumulation amount of a second heating region heated by a second heat generating element, among the plurality of heat generating elements, is maintained within a predetermined range,
 wherein the first heating region heated by the first heat generating element is a heating region that overlaps an edge of the recording material in the direction orthogonal to the conveying direction, and
 wherein the second heating region heated by the second heat generating element is a heating region that overlaps a center of the recording material in the direction orthogonal to the conveying direction.

2. The image heating apparatus according to claim 1, wherein the control portion controls the electrical power supplied to each of the plurality of heat generating elements according to image information of the image formed on the recording material.

3. The image heating apparatus according to claim 1, wherein, when the difference between the first count value and the second count value becomes greater than a predetermined value, the control portion controls the electrical power supplied to the first heat generating element so that the difference between the first count value and the second count value is within the predetermined range.

4. The image heating apparatus according to claim 1, wherein, when the difference between the first count value and the second count value becomes greater than a predetermined value, the control portion controls the electrical power supplied to the second heat generating element so that the difference between the first count value and the second count value is within the predetermined range.

5. The image heating apparatus according to claim 1, wherein, when the difference between the first count value and the second count value becomes greater than a predetermined value, the control portion controls the electrical power supplied to the first heat generating element so as to be equal to electrical power supplied when the heating region heated by the first heat generating element is an image heating region.

6. The image heating apparatus according to claim 1, wherein the control portion controls the electrical power supplied to the plurality of heat generating elements by changing a control target temperature.

7. The image heating apparatus according to claim 1, wherein each count value, of the plurality of count values, is acquired on the basis of at least a heating history and a heat radiation history in a respective heating region, of the plurality of heating regions.

8. The image heating apparatus according to claim 7, wherein the heating history of a heat generating element, of the plurality of heat generating elements, is acquired on the basis of at least one of a temperature of the heater and an amount of the electrical power supplied to the heat generating element.

9. The image heating apparatus according to claim 7, wherein the heat radiation history is acquired on the basis of at least one of whether the recording material passes through the heating region, a type of the recording material, a period in which the electrical power is not supplied to a respective heat generating element, of the plurality of heat generating elements, and a change over time in the temperature of the heater.

10. The image heating apparatus according to claim 1, further comprising a tubular film that rotates while an inner surface thereof makes contact with the heater, wherein the image formed on the recording material is heated via the film.

11. An image forming apparatus comprising:
 an image forming portion that forms an image on a recording material; and
 a fixing portion that fixes the image, formed on the recording material, to the recording material, wherein the fixing portion is the image heating apparatus according to claim 1.

12. An image heating apparatus that heats an image formed on a recording material, the image heating apparatus comprising:
 a heater having a plurality of heat generating elements divided in a direction orthogonal to a conveying direction of the recording material;
 an acquisition portion that acquires heat accumulation amounts of each of a plurality of heating regions heated by the plurality of heat generating elements, respectively; and
 a control portion configured to independently control electrical power supplied to the plurality of heat generating elements, the control portion controlling the electrical power supplied to each of the plurality of heat generating elements so that a difference between a first heat accumulation amount of a first heating region heated by a first heat generating element, among the plurality of heat generating elements, and a second heat accumulation amount of a second heating region heated by a second heat generating element, among the plurality of heat generating elements, is maintained within a predetermined range,
 wherein the first heating region is a heating region that overlaps an edge of the recording material in the direction orthogonal to the conveying direction, and
 wherein the second heating region is a heating region that overlaps a center of the recording material in the direction orthogonal to the conveying direction.

13. The image heating apparatus according to claim 12, wherein the control portion controls the electrical power supplied to each of the plurality of heat generating elements according to image information of the image formed on the recording material.

14. The image heating apparatus according to claim 12, wherein, when the difference between the first heat accumulation amount and the second heat accumulation amount becomes outside of the predetermined range, the control portion controls the electrical power supplied to the first heat generating element so that the difference between the first heat accumulation amount and the second heat accumulation amount is within the predetermined range.

15. The image heating apparatus according to claim 12, wherein, when the difference between the first heat accumulation amount and the second heat accumulation amount becomes outside of the predetermined range, the control portion controls the electrical power supplied to the second heat generating element so that the difference between the first heat accumulation amount and the second heat accumulation amount is within the predetermined range.

16. The image heating apparatus according to claim 12, wherein the control portion controls the electrical power supplied to the plurality of heat generating elements by changing control target temperatures of the plurality of the heat generating elements, respectively.

17. The image heating apparatus according to claim 12, wherein the first heat accumulation amount and the second heat accumulation amount are acquired on the basis of at least a heating history and a heat radiation history in a respective heating region, of the plurality of heating regions.

18. The image heating apparatus according to claim 17, wherein the heating history of a heat generating element, of the plurality of heat generating elements, is acquired on the basis of at least one of a temperature of the heater and an amount of the electrical power supplied to the heat generating element.

19. The image heating apparatus according to claim 17, wherein the heat radiation history is acquired on the basis of at least one of whether the recording material passes through the heating region, a type of the recording material, a period in which the electrical power is not supplied to a respective heat generating element, of the plurality of heat generating elements, and a change over time in the temperature of the heater.

20. The image heating apparatus according to claim 12, further comprising a tubular film that rotates while an inner surface thereof makes contact with the heater, wherein the image on the recording material is heated via the film.

21. The image heating apparatus according to claim 20, further comprising a rubber roller for forming a nip portion for nipping and conveying the recording material together with the heater through the film.

22. An image forming apparatus comprising:
an image forming portion that forms an image on a recording material; and
a fixing portion that fixes the image, formed on the recording material, to the recording material, wherein the fixing portion is the image heating apparatus according to claim 12.

23. An image heating apparatus that heats an image formed on a recording material, the image heating apparatus comprising:
a heater having a plurality of heat generating elements divided in a direction orthogonal to a conveying direction of the recording material;
an acquisition portion that acquires heat accumulation amounts of each of a plurality of heating regions heated by the plurality of heat generating elements, respectively; and
a control portion configured to independently control heat generating quantities of the plurality of heat generating elements, the control portion controlling an individual heat generating quantity of each of the plurality of heat generating elements according to image information of the image formed on the recording material,
wherein the control portion controls the electrical power supplied to each of the plurality of heat generating elements so that a difference between a first heat accumulation amount of a first heating region heated by a first heat generating element, among the plurality of heat generating elements, and a second heat accumulation amount of a second heating region heated by a second heat generating element, among the plurality of heat generating elements, is maintained within a predetermined range, and
wherein the heat accumulation amounts are updated for every predetermined time period.

24. The image heating apparatus according to claim 23, wherein the first heat accumulation amount and the second heat accumulation amount are acquired on the basis of at least a heating history and a heat radiation history in a respective heating region, of the plurality of heating regions.

25. The image heating apparatus according to claim 24, wherein the heating history of a heat generating element, of the plurality of heat generating elements, is acquired on the basis of at least one of a temperature of the heater and an amount of the electrical power supplied to the heat generating element.

26. The image heating apparatus according to claim 24, wherein the heat radiation history is acquired on the basis of at least one of whether the recording material passes through the heating region, a type of the recording material, a period in which the electrical power is not supplied to a respective heat generating element, of the plurality of heat generating elements, and a change over time in the temperature of the heater.

27. The image heating apparatus according to claim 23, further comprising a tubular film that rotates while an inner surface thereof makes contact with the heater, wherein the image on the recording material is heated via the film.

28. The image heating apparatus according to claim 27, further comprising a rubber roller for forming a nip portion for nipping and conveying the recording material together with the heater through the film.

* * * * *